United States Patent
Morimoto et al.

(10) Patent No.: US 11,995,107 B2
(45) Date of Patent: May 28, 2024

(54) CONTROL METHOD, RECORDING MEDIUM, AND CONTROL SYSTEM

(71) Applicant: Panasonic Intellectual Property Management Co., Ltd., Osaka (JP)

(72) Inventors: Takashi Morimoto, Tokyo (JP); Jitsuho Nishida, Tokyo (JP); Kazuki Sakamoto, Shiga (JP); Yasuhiko Akemine, Tokyo (JP); Kyohei Sasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 17/772,083

(22) PCT Filed: Feb. 25, 2021

(86) PCT No.: PCT/JP2021/007161
§ 371 (c)(1),
(2) Date: Apr. 26, 2022

(87) PCT Pub. No.: WO2021/172451
PCT Pub. Date: Sep. 2, 2021

(65) Prior Publication Data
US 2022/0374456 A1    Nov. 24, 2022

(30) Foreign Application Priority Data

Feb. 27, 2020 (JP) .................................. 2020-032379
Feb. 19, 2021 (JP) .................................. 2021-024950

(51) Int. Cl.
*G06F 7/00* (2006.01)
*G06F 16/2457* (2019.01)
(Continued)

(52) U.S. Cl.
CPC ........ *G06F 16/287* (2019.01); *G06F 16/2457* (2019.01); *G06F 16/248* (2019.01)

(58) Field of Classification Search
CPC .. G06F 16/287; G06F 16/2457; G06F 16/248; G06F 16/245; G06F 16/285;
(Continued)

(56) References Cited

U.S. PATENT DOCUMENTS

2016/0094737 A1* 3/2016 Sugiura ............... H04N 1/00501
358/1.15
2020/0258376 A1* 8/2020 Komiya .................... G06F 8/65
(Continued)

FOREIGN PATENT DOCUMENTS

| JP | 2002-358377 A | 12/2002 |
|----|---------------|---------|
| JP | 5216466 B2    | 6/2013  |
| JP | 2019-117448 A | 7/2019  |

OTHER PUBLICATIONS

International Search Report issued in corresponding International Application No. PCT/JP2021/007161 dated Apr. 27, 2021 w/English Translation.

(Continued)

*Primary Examiner* — Mohammad A Sana
(74) *Attorney, Agent, or Firm* — Rimon P.C.

(57) ABSTRACT

The control system includes: a determiner that determines, based on browsing information on browsing using a browsing device, a target device and a browsing relation degree indicating relationship between a predetermined function of the target device and the browsing; a device information obtainer that obtains device information on a target control device that is the target device having the browsing relation degree of the browsing greater than or equal to a threshold; and a control unit that changes an operation mode for executing the predetermined function of the target control (Continued)

device when the device information obtained satisfies a specific condition.

18 Claims, 14 Drawing Sheets

(51) Int. Cl.
*G06F 16/248* (2019.01)
*G06F 16/28* (2019.01)

(58) Field of Classification Search
CPC .............. G06F 16/907; G06F 16/9577; G06Q 30/0272; G06Q 30/0267; G06Q 30/0242
See application file for complete search history.

(56) References Cited

U.S. PATENT DOCUMENTS

| | | |
|---|---|---|
| 2020/0349940 A1* | 11/2020 | Ko .................... H04L 67/125 |
| 2021/0049275 A1* | 2/2021 | Higashiyama .......... H04L 63/20 |
| 2021/0073108 A1* | 3/2021 | Wang ................. G06F 11/3696 |
| 2021/0090431 A1* | 3/2021 | Tsuda ..................... H04M 11/00 |

OTHER PUBLICATIONS

Tomoki Watanabe, et al., "Proposal of Ambient Appliance Operation Method interlocked Web Pages", Information Processing Society of Japan, IPSJ SIG Technical Report, Feb. 2012, pp. 1-8, w/partial English translation.

* cited by examiner

CONTROL METHOD, RECORDING MEDIUM, AND CONTROL SYSTEM

CROSS-REFERENCE OF RELATED APPLICATIONS

This application is the U.S. National Phase under 35 U.S.C. § 371 of International Patent Application No. PCT/JP2021/007161, filed on Feb. 25, 2021, which in turn claims the benefit of Japanese Application No. 2020-032379, filed on Feb. 27, 2020, and Japanese Application No. 2021-024950, filed on Feb. 19, 2021, the entire disclosures of each of which Applications are incorporated by reference herein.

TECHNICAL FIELD

The present disclosure generally relates to control methods, recording media, and control systems. The present disclosure relates, in particular, to control methods, recording media, and control systems relating to the control of target devices.

BACKGROUND ART

Patent Literature (PTL) 1 discloses a display device connected to or attached to a device for setting the function of the device. The display device includes an inputter (touch panel portion) for performing an operation, and a display in which one or more keys for selecting and setting functions in the device are arranged in the display screen. The display also displays a setting screen that switches the display up to the screen for setting the target function each time a key is selected by inputting to the inputter, and a screen help that explains each function that can be set on the display device. When the help screen is browsed by inputting to the inputter, the display provides a simple help display that guides to emphasize the key to be selected on the setting screen so that the function browsed on the help screen can be set and selected.

CITATION LIST

Patent Literature

[PTL 1] Japanese Patent No. 5216466

SUMMARY OF INVENTION

Technical Problem

In PTL 1, a simple help display is possible when the help screen is viewed on the display device. However, PTL 1 cannot deal with the case where the user examines the function settings and the like of the device with an information terminal such as his/her own smartphone or personal computer other than the display device. The challenge is to provide a control method, a program, and a control system that can improve the usability of the target device.

Solution to Problem

The control method of one aspect of the present disclosure includes: determining, based on browsing information on browsing using a browsing device, a browsing relation degree indicating relationship between (i) a target device and a predetermined function of the target device and (ii) the browsing; obtaining device information on a target control device that is the target device having the browsing relation degree of the browsing greater than or equal to a threshold; and changing an operation mode for executing the predetermined function of the target control device when the device information obtained satisfies a specific condition.

The recording medium of one aspect of the present disclosure is a non-transitory computer-readable recording medium having recorded thereon a program for causing one or more processors to execute the control method.

The control system of one aspect of the present disclosure includes: a determiner that determines, based on browsing information on browsing using a browsing device, a browsing relation degree indicating relationship between (i) a target device and a predetermined function of the target device and (ii) the browsing; a device information obtainer that obtains device information on a target control device that is the target device determined based on the browsing relation degree of the browsing; and a control unit that changes an operation mode for executing the predetermined function of the target control device when the device information obtained satisfies a specific condition.

Advantageous Effects of Invention

According to the aspect of the present disclosure, there is an effect that the usability of the target device can be improved.

BRIEF DESCRIPTION OF DRAWINGS

FIG. 1 is a schematic diagram of an entire system including a control system according to an embodiment of the present disclosure.
FIG. 2 is a flowchart of a control method executed by the control system described above.
FIG. 3 is a block diagram of a browsing device included in the overall system described above.
FIG. 4 is a block diagram of a target device included in the overall system described above.
FIG. 5 is a block diagram of the control system.
FIG. 6 is an explanatory diagram of an example of an operation screen relating to the target device.
FIG. 7 is an explanatory diagram of an example of the operation screen relating to the target device.
FIG. 8 is an explanatory diagram of an example of the operation screen relating to the target device.
FIG. 9 is a flowchart of a control method executed by the control system according to another specific example.
FIG. 10A is a first diagram illustrating control executed by the control system according to another specific example.
FIG. 10B is a second diagram illustrating control executed by the control system according to another specific example.
FIG. 10C is a third diagram illustrating control executed by the control system according to another specific example.

FIG. 10D is a fourth diagram illustrating control executed by the control system according to another specific example.

FIG. 10E is a fifth diagram illustrating control executed by the control system according to another specific example.

FIG. 10F is a sixth diagram illustrating control executed by the control system according to another specific example.

FIG. 10G is a seventh diagram illustrating control executed by the control system according to another specific example.

FIG. 11A is an eighth diagram illustrating control executed by the control system according to another specific example.

FIG. 11B is a ninth diagram illustrating control executed by the control system according to another specific example.

FIG. 11C is a tenth diagram illustrating control executed by the control system according to another specific example.

FIG. 11D is an eleventh diagram illustrating control executed by the control system according to another specific example.

FIG. 11E is a twelfth diagram illustrating the control executed by the control system according to another specific example.

FIG. 11F is a thirteenth diagram illustrating control executed by the control system according to another specific example.

FIG. 11G is a fourteenth diagram illustrating control executed by the control system according to another specific example.

FIG. 12A is a fifteenth diagram illustrating control executed by the control system according to another specific example.

FIG. 12B is a sixteenth diagram illustrating control executed by the control system according to another specific example.

FIG. 12C is a seventeenth diagram illustrating the control executed by the control system according to another specific example.

FIG. 12D is an eighteenth diagram illustrating the control executed by the control system according to another specific example.

DESCRIPTION OF EMBODIMENT (1) Embodiment (1-1) Overview

Figure 1:
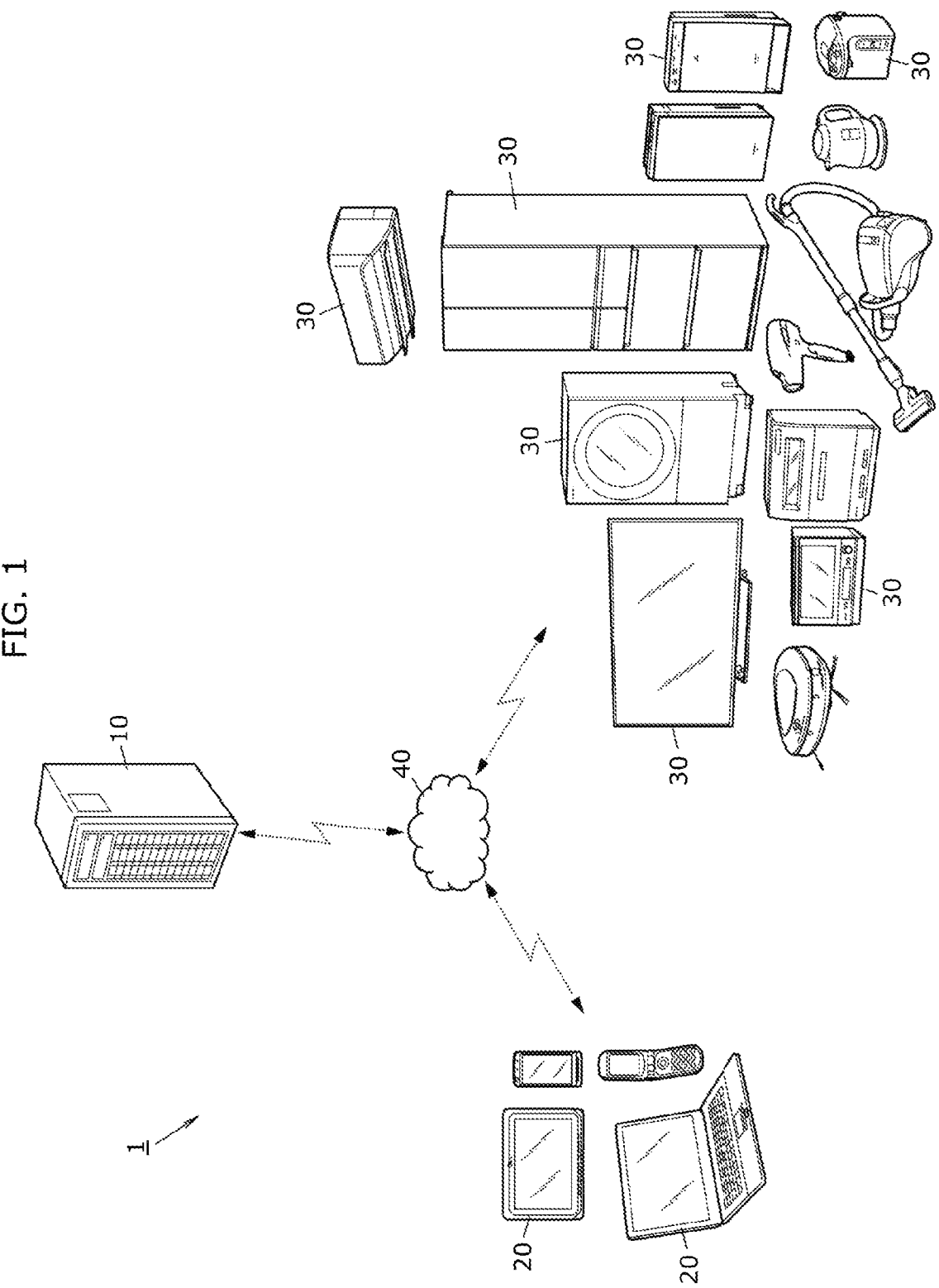
[FIG. 1]
Figure 2:
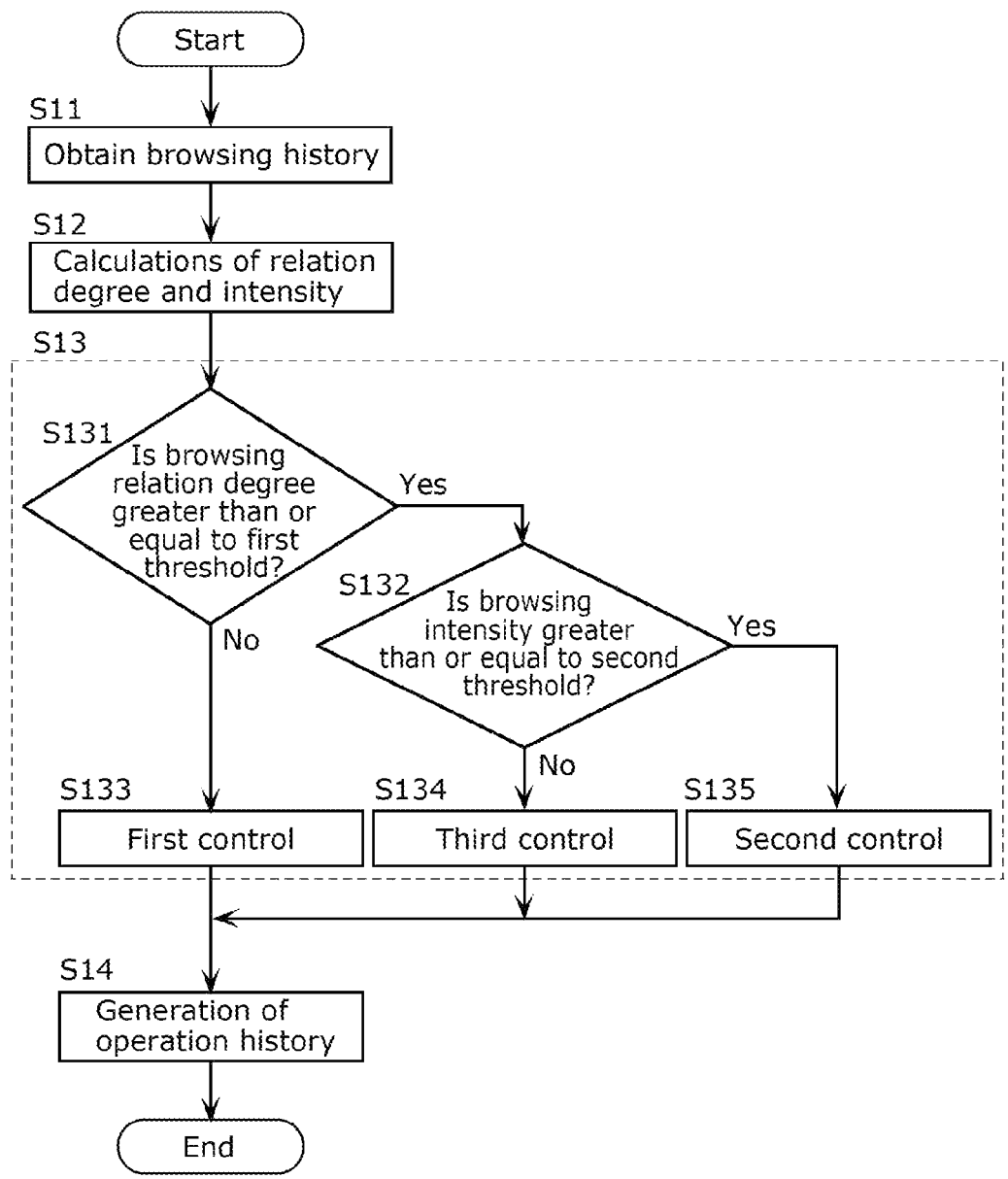
[FIG. 2]

The control method of one embodiment can be used in device control system 1 as shown in FIG. 1 to improve the usability of target device 30. As shown in FIG. 2, the control method of the present embodiment includes determination step S12 and control step S13. Determination step S12 is a step of determining a browsing relation degree indicating the relationship between target device 30 and browsing, and a browsing intensity indicating an intensity of browsing, based on the browsing information on browsing using browsing device 20. Control step S13 is a step of reflecting the browsing relation degree and the browsing intensity in the control of target device 30.

According to the control method of the present embodiment, the content of browsing by the user using browsing device 20 can be reflected in the control at target device 30. The information browsed by the user is likely to be information that the user is interested in. Therefore, by reflecting the browsing information on browsing by the user in the control at target device 30, the usability of target device 30 can be improved. For example, based on the browsing information, it is possible to present and execute a function that meets the user's request to the user at target device 30. Furthermore, since the browsing information on browsing by browsing device 20 is used, it is possible to present and execute a function that meets the user's request in target device 30 even if the user does not operate target device 30. Therefore, it can be expected that the customer satisfaction of target device 30 will be improved.

(1-2) Details

Hereinafter, the control method of the present embodiment will be described in more detail with reference to the drawings. The control method of the present embodiment is included in the process executed by device control system 1 shown in FIG. 1.

Device control system 1 includes control system 10, browsing device 20, and target device 30. Although a plurality of browsing devices 20 are illustrated in FIG. 1, device control system 1 is only needed to include at least one browsing device 20. Similarly, although a plurality of target devices 30 are drawn in FIG. 1, device control system 1 is only needed to include at least one target device 30.

Control system 10 is a system that executes the control method of the present embodiment. Control system 10 can be connected to browsing device 20 and target device 30 via communication network 40. It should be noted that communication network 40 may include the Internet.

Communication network 40 may include not only a network compliant with a single communication protocol but also a plurality of networks compliant with different communication protocols. The communication protocol can be selected from a variety of well-known wired and wireless communication standards. Although simplified in FIG. 1, communication network 40 may include data communication devices such as repeater hubs, switching hubs, bridges, gateways, routers and the like.

Browsing device 20 is an information terminal used for browsing (searching) arbitrary information. In the present disclosure, "browsing" includes not only the obtaining of information by visual means but also the obtaining of information by auditory means. For example, "browsing" may include searching for information on the Internet using a browser and searching for information using a virtual personal assistant (VPA). Browsing device 20 is, for example, a smartphone. It should be noted that browsing device 20 is not limited to a smartphone, but may be a portable information terminal such as a tablet terminal, a personal computer (desktop computer, laptop computer, and the like), a smart TV, or the like.

Figure 3:
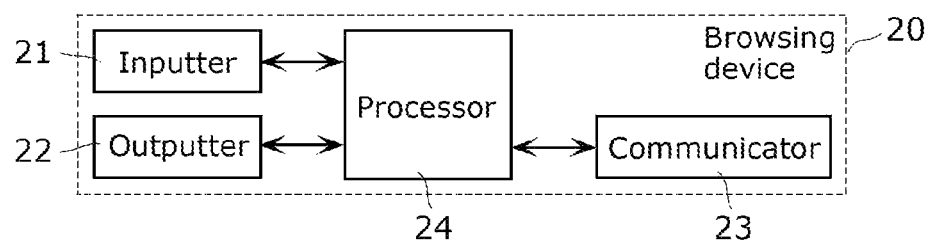
[FIG. 3]

As shown in FIG. 3, browsing device 20 includes inputter 21, outputter 22, communicator 23, and processor 24.

Inputter 21 includes an input device for operating browsing device 20, a voice input device, and a camera. The input device includes, for example, a touch pad and/or one or more buttons. The input device is not limited to the touch pad, and may be a keyboard, a pointing device, a mechanical switch, or the like. In addition, inputter 21 may include a plurality of input devices.

Outputter 22 includes an output device for presenting the information browsed by browsing device 20. The output device includes an image display device for displaying the information browsed by browsing device 20. The image display device is a thin display device such as a liquid crystal display or an organic EL display. It should be noted that a touch panel may be configured by the touch pad of inputter 21 and the image display device of outputter 22. In addition, the output device may include an audio output device that outputs the information browsed by browsing device 20 by sound.

In the present disclosure, the information browsed by the user using browsing device 20 as necessary is referred to as browsing content. The browsing content may include not only the information stored in browsing device 20 (internal information) but also the information stored in a device other than browsing device 20 (external information). The external information may include information that can be browsed (can be accessed) through communication network 40, for example, information that can be accessed on the Internet. For example, web pages available via e-mail or the Internet, and document files, audio files, and the like that can be downloaded via the Internet may also be included in the browsing content. A web page may include a web page operated by an individual or a company, and a search screen by a search engine (search results, and the like).

Communicator 23 can be connected to communication network 40 and includes a function of performing communication through communication network 40.

Communicator 23 conforms to a predetermined communication protocol. A predetermined communication protocol can be selected from a variety of well-known wired and wireless communication standards.

Processor 24 is a control circuit that controls the operation of browsing device 20. Processor 24 controls inputter 21, outputter 22, and communicator 23. Processor 24 can be realized by, for example, one or more processors (microprocessors) and one or more memories.

Processor 24 includes a function that enables browsing of information. For example, processor 24 presents information to the user in outputter 22 according to the input from the user received by inputter 21, thereby enabling the information to be browsed. For example, processor 24 accesses an information resource such as a web page through communication network 40, and outputter 22 presents information that meets the user's request input by inputter 21.

Target device 30 is a device that is subject to control (use) by the user. For example, target device 30 is an electric device used in a facility. The facility is a detached house. It should be noted that in addition to detached houses, examples of facilities include apartment houses (dwelling units, common areas), stores, and buildings (entire building, inside floors). In addition, the facility may include not only a building but also a building and a site on which the building exists, and examples thereof include factories, parks, hospitals, commercial facilities, and the like.

Figure 4:
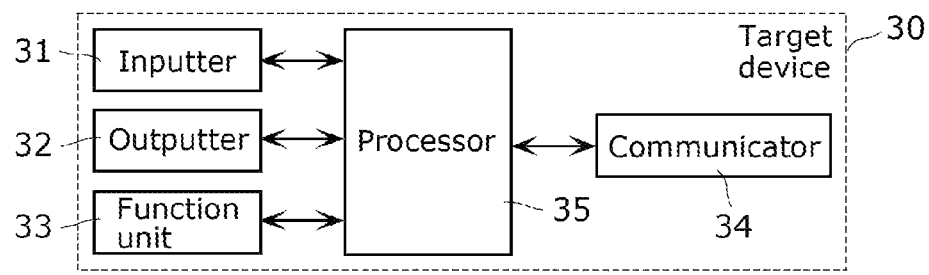
[FIG. 4]

As shown in FIG. 4, target device 30 includes inputter 31, outputter 32, function unit 33, communicator 34, and processor 35.

Inputter 31 includes an input device for operating target device 30. The input device may include a manual input device, a voice input device, and a camera. The manual input device includes, for example, a touchpad and/or one or more buttons. The manual input device is not limited to the touch pad, and may be a keyboard, a pointing device, a mechanical switch, or the like. In addition, inputter 31 may include a plurality of input devices.

Outputter 32 includes an output device for presenting information on target device 30. The information on target device 30 may include information indicating the operating state of target device 30 and information for operating target device 30. The output device includes an image display device for displaying information on target device 30. The image display device is a thin display device such as a liquid crystal display or an organic EL display. It should be noted that a touch panel may be configured by the touch pad of inputter 21 and the image display device of outputter 22. In addition, the output device may include a voice output device that outputs information on target device 30 by sound.

Function unit 33 includes a mechanical structure that realizes a predetermined function in target device 30. The functions realized by function unit 33 mainly differ depending on the type of target device 30.

Examples of target device 30 include a sensor-related device, an air-conditioning-related device, a housing/facility-related device, a cooking/housework-related device, a health management-related device, a management/operation-related device, and an AV-related device.

Examples of the sensor-related device include fire sensors, human body detection sensors, temperature sensors, $CO2$ sensors, and current amount sensors. Examples of the air-conditioning-related device include air conditioners, electric fans, ventilation fans, air purifiers, hot carpets, and oil fan heaters. Examples of the housing/facility-related device include electric blinds, electric curtains, water heaters, electric locks, smart meters, solar power generation device, storage batteries, fuel cells, general lighting, single-function lighting, and emergency lights. Examples of the cooking/housework-related device include microwave ovens, dishwashers, dish dryers, washing machines, clothes dryers, and automatic vacuum cleaners. Examples of the health management-related device include weight scales, body fat scales, thermometers, sphygmomanometers, and blood glucose meters. Examples of the management/operation-related device include controllers and switches (HA device). Examples of the AV-related device include TVs and displays.

In the present embodiment, target device 30 is a washing machine. In this case, function unit 33 includes a mechanical structure (for example, a rotary drum, a water supply/drainage mechanism, a detergent charging mechanism, a timer) for realizing a function of the washing machine. In the present embodiment, function unit 33 can execute a plurality of functions. The plurality of functions include a plurality of courses with different laundry contents. Examples of the plurality of courses include a first course in which normal washing is performed, a second course having a weaker detergency than the first course, and a third course having a stronger detergency than the first course. The second course is suitable for washing delicate clothes. The third course is a course suitable for washing to remove mud dirt and the like.

Communicator 34 can be connected to communication network 40 and includes a function of performing communication through communication network 40. Communicator 34 conforms to a predetermined communication protocol. The predetermined communication protocol can be selected from a variety of well-known wired and wireless communication standards.

Processor 35 is a control circuit that controls the operation of target device 30. That is, processor 35 controls inputter 31, outputter 32, function unit 33, and communicator 34. Processor 35 can be realized by, for example, one or more processors (microprocessors) and one or more memories.

Processor 35 executes a control of target device 30. The control of target device 30 includes a control for presenting a function that can be executed by target device 30 (presentation control) and a control for causing target device 30 to execute the function (execution control). In the presentation control, processor 35 displays the operation screen on outputter 32. The operation screen is a screen for the user to select a function to be executed by target device 30 by inputter 31. In the present embodiment, function unit 33 includes first to third courses as a plurality of executable functions. In this case, processor 35 presents the first to third courses on the operation screen. In the execution control, processor 35 causes target device 30 to execute the function selected by the user on the operation screen. For example, when the first mode is selected on the operation screen, target device 30 is made to execute the first mode.

In addition, processor 35 executes a control of target device 30 according to the control command information. Here, the control command information includes information for changing the control content of target device 30. More specifically, the control command information may include information for changing the content of the presentation control and information for changing the content of the execution control. The control command information is given from control system 10 through communication network 40.

Control system 10 is a system (microprocessor) that executes the control method of the present embodiment. Control system 10 can be connected to browsing device 20 and target device 30 via communication network 40.

Figure 5:
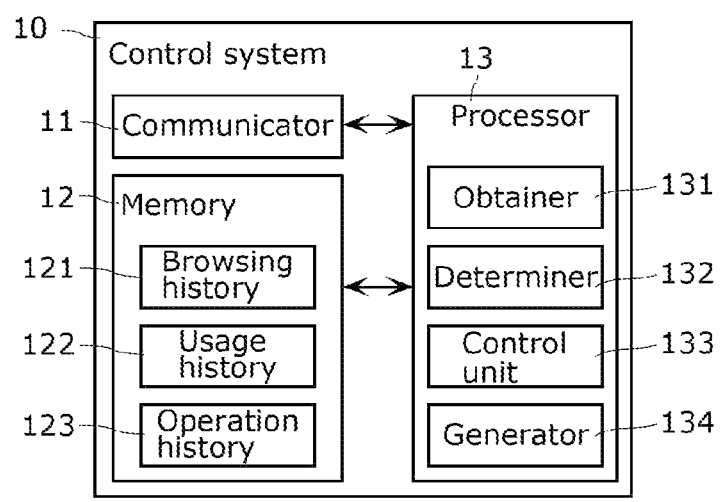
[FIG. 5]

As shown in FIG. 5, control system 10 includes communicator 11, storage 12, and processor 13. Control system 10 can be realized, for example, by a server.

Communicator 11 is a communication interface. Communicator 11 can be connected to communication network and includes a function of performing communication through communication network 40. Communicator 11 conforms to a predetermined communication protocol. The predetermined communication protocol can be selected from a variety of well-known wired and wireless communication standards. Communicator 11 is communicably connected to browsing device 20 and target device 30. Accordingly, control system 10 can communicate with browsing device 20 and target device 30.

Storage 12 is used to store the information to be used by processor 13 and the information to be generated by processor 13. For example, storage 12 stores browsing history 121, usage history 122, and operation history 123. Browsing history 121, usage history 122, and operation history 123 will be described later. Storage 12 includes one or more storage devices. The storage device is, for example, a random access memory (RAM).

Processor 13 is configured to execute an overall control of control system 10, that is, to control communicator 11 and storage 12. Processor 13 can be realized by, for example, a computer system including one or more processors (microprocessors) and one or more memories. That is, one or more processors execute one or more (computer) programs (applications) stored in one or more memories, thereby functioning as processor 13. Although the program is recorded in advance in the memory of processor 13 here, the program may be provided through a telecommunication line such as the Internet or by being recorded in a non-temporary recording medium such as a memory card.

As shown in FIG. 5, processor 13 includes obtainer 131, determiner 132, control unit 133, and generator 134. In FIG. 5, obtainer 131, determiner 132, control unit 133, and generator 134 do not show a substantive configuration, but show a function realized by processor 13.

Obtainer 131 obtains browsing information on browsing using browsing device 20. The browsing information includes a target of browsing, a timing of browsing, and a mode of browsing. The target of browsing indicates information (browsing content) browsed (accessed) by the user by browsing using browsing device 20. The browsing contents are as described above. It should be noted that the target of browsing may be the browsing content itself or the metadata of the browsing content. The timing of browsing includes the time when browsing using browsing device 20 is executed (for example, the date and time of browsing). It should be noted that when the same browsing content is browsed a plurality of times on browsing device 20, the timing of browsing includes the times when the plurality of browsing are executed. The mode of browsing may include information that can evaluate the degree of interest in the browsing content of the user. For example, the mode of browsing includes the display time of the browsing content, the browsing rate of the browsing content (how much of the browsing content was browsed), and the number of times the browsing content was accessed. In the present embodiment, obtainer 131 obtains browsing information from browsing device 20. The browsing information is stored in storage 12. Browsing history 121 stored in storage 12 is a history of browsing information.

In addition, obtainer 131 obtains usage information on the use of target device 30. The usage information includes a target of use, a timing of use, and a mode of use. The target of use indicates target device 30 used by the user. The timing of use includes the time when target device 30 is used (for example, the date and time of use). The mode of use may include information indicating which function of user's target device 30 has been used. For example, the mode of use indicates in which of the first to third modes target device operates. In the present embodiment, obtainer 131 obtains usage information from target device 30. The usage information is stored in storage 12. Usage history 122 stored in storage 12 is a history of usage information.

Determiner 132 determines the browsing relation degree and the browsing intensity of target device 30 based on the browsing information on browsing using browsing device 20. Here, the linkage between browsing device 20 and target device 30 is performed by the identification information unique to the user. That is, if browsing device 20 and target device 30 are linked to the same user's identification information, browsing device 20 and target device 30 are linked to each other, and the browsing relation degree and browsing intensity can be obtained for target device 30 based on the browsing information on browsing using browsing device 20.

The browsing relation degree indicates the relationship between target device 30 and browsing. Specifically, the browsing relation degree is an index for determining to what extent the information (browsing content) browsed by the user by browsing device 20 relates to target device 30. In the present embodiment, the browsing relation degree indicates the relationship between a function that can be executed by target device 30 and browsing. That is, the browsing relation degree is determined for each function that can be executed by target device 30. If the browsing content directly or indirectly relates to target device 30, it is determined that the browsing relation degree is relatively high. In particular, if the browsing content is a content relating to a specific function of target device 30, it is determined that the browsing relation degree relating to the specific function is high. For example, as the browsing content directly relating to target device 30, a web page relating to target device 30 of the seller of target device 30 is included. The web page relating to target device 30 in this case can include a product promotion page for target device 30, an e-mail such as a function introduction after purchasing the product (whether the e-mail has been opened is determined with a web beacon), and a manual page relating to target device 30, as well as the contents of inquiries to, the inquiry window (call center) on the Web, and the chat bot on the Web. On the other hand, the browsing content indirectly relating to target device 30 includes a web page relating to target device 30 other than the seller of target device 30. The web page relating to target device 30 in this case can include a search page relating to target device 30 in a search engine, a web page of target device 30 in a review site and the like, and a page relating to consumer goods relating to target device 30 such as detergent. On the other hand, if the browsing content does not relate to target device 30, it is determined that the browsing relation degree is relatively low. For example, browsing contents not relating to target device 30 include web pages of products different from target device 30 and web pages in which terms relating to target device 30 do not exist at all.

Browsing intensity indicates the intensity of browsing. Specifically, the browsing intensity is an index for determining how much interest the user has in the information (browsing content) browsed by browsing device 20. As an example, the browsing intensity is obtained by adding an evaluation value to the initial value based on the browsing information. In the present embodiment, the initial value is 0. In the present embodiment, the browsing intensity is determined based on the difference between the timing of use of target device 30 and the timing of browsing. That is, the browsing intensity includes an evaluation value based on the difference between the timing of use of target device 30 and the timing of browsing. The timing of use of target device 30 can be obtained from usage history 122. In addition, the timing of browsing can be obtained from browsing history 121. It is determined that the smaller the difference between the timing of use of target device 30 and the timing of browsing, the greater the browsing intensity. Therefore, the evaluation value based on the difference between the timing of use of target device 30 and the timing of browsing is set larger as the difference between the timing of use of target device 30 and the timing of browsing is smaller. Furthermore, in the present embodiment, the browsing intensity is also determined based on the mode of browsing. That is, the browsing intensity includes an evaluation value based on the mode of browsing. The mode of browsing can be obtained from browsing history 121. As an example, the evaluation value based on the mode of browsing is set larger as the display time of the browsing content is longer, the browsing rate of the browsing content is higher, and the number of accesses of the browsing content is larger. However, if the predetermined condition is satisfied, determiner 132 sets the browsing intensity to the initial value. The predetermined condition is a condition when it is considered that the user is no longer interested in the browsing content. In the present embodiment, the predetermined condition is that a predetermined time has elapsed from browsing or operating the device. The predetermined time can be appropriately set according to the browsing content, such as one week, one month, and half a year. In addition, the initial value may be set according to the operation of the device. For example, when a course different from the course with high browsing intensity is selected and washed, the initial value may be returned.

Control unit 133 reflects the browsing relation degree and the browsing intensity in the control of target device 30. As described above, the control of target device 30 includes a control that presents a function that can be executed by target device 30. In the present embodiment, control unit 133 determines how to present the function in target device 30 based on the browsing relation degree and the browsing intensity, and thereby the browsing relation degree and the browsing intensity are reflected in the control of target device 30. More specifically, control unit 133 determines the operation screen displayed by outputter 32 of target device 30 based on the browsing relation degree and the browsing intensity. In the present embodiment, control unit 133 selects one of the first control, the second control, and the third control as the control for determining the operation screen, and gives the control command information corresponding to the selected control to target device 30 through communicator 11.

Figure 6:
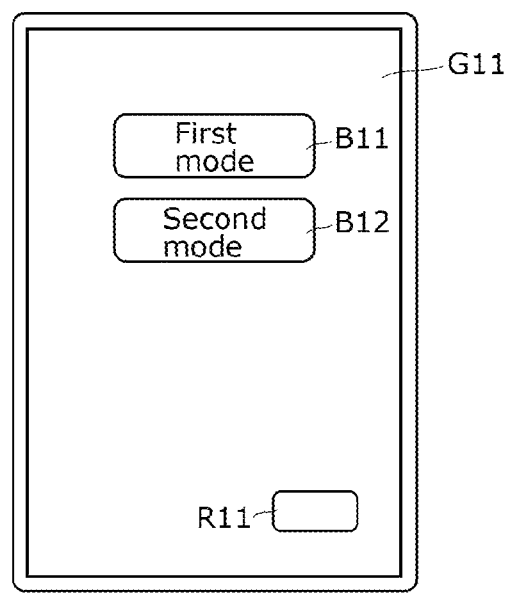
[FIG. 6]

The first control is a control for setting the operation screen displayed by outputter 32 of target device 30 to the default operation screen. Control unit 133 executes the first control when it is determined from the browsing relation degree and the browsing intensity that the browsing using browsing device 20 has a low relationship with target device 30. For example, control unit 133 executes the first control if the browsing relation degree is smaller than the first threshold. The first threshold is a threshold for determining whether the browsing relation degree is low. If the browsing relation degree is smaller than the first threshold, it is determined that the browsing relation degree is low (relationship is low). FIG. 6 shows operation screen G11 which is an example of the operation screen displayed in the first control. Operation screen G11 includes selection buttons B11 and B12 and switching button R11. Selection button B11 corresponds to the first mode, and selection button B12 corresponds to the second mode. Switching button R11 is a button for displaying a mode (for example, a third mode) that is not displayed on operation screen G11. It should be noted that in FIG. 6, the reference numerals and the accessories (indicator lines, arrows, and the like) of the reference numerals are illustrated for the purpose of explaining operation screen G11, and are not included in operation screen G11 itself. This also applies to FIG. 7 and FIG. 8.

Figure 7:
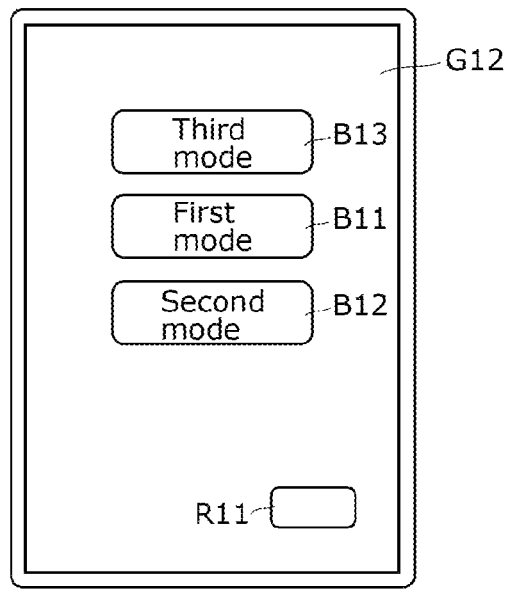
[FIG. 7]

The second control is a control that sets the operation screen displayed by outputter 32 of target device 30 to the operation screen that emphasizes the function that the user is likely to be interested in. When control unit 133 determines that browsing using browsing device 20 has high relationship to a specific function of target device 30, and further, the degree of interest in the specific function of target device 30 is high based on the browsing relation degree and the browsing intensity, control unit 133 executes the second control. For example, control unit 133 executes the second control when the browsing relation degree is greater than or equal to a first threshold and the browsing intensity is greater than or equal to a second threshold. The second threshold is a threshold for determining whether the browsing intensity is high. If the browsing intensity is greater than or equal to the second threshold, it is determined that the browsing intensity is high. FIG. 7 shows operation screen G12 which is an example of the operation screen displayed in the second control. Operation screen G12 corresponds to a case where it is determined that browsing using browsing device 20 has high relationship to the third mode of target device 30, and further, the degree of interest in the third mode of target device 30 is high. Operation screen G12 includes selection button B13 in addition to selection buttons B11 and B12 displayed on operation screen G11. Selection button B13 corresponds to the third mode. Furthermore, on operation screen G12, selection button B13 is arranged above selection buttons B11 and B12. This makes the third mode more noticeable than the first and second modes. Therefore, according to operation screen G12, it is possible to present the third mode in which the user is interested so that the user can easily select it.

Figure 8:
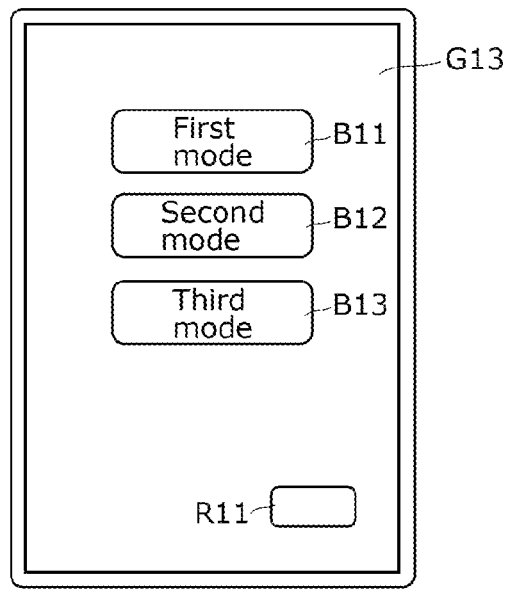
[FIG. 8]

The third control is a control for setting the operation screen displayed by outputter 32 of target device 30 to the operation screen to which a function that the user may be interested in is added. When control unit 133 determines that browsing using browsing device 20 has high relationship to a specific function of target device 30, and further, the degree of interest in the specific function of target device 30 is not high based on the browsing relation degree and the browsing intensity, control unit 133 executes the third control. For example, if the browsing relation degree is greater than or equal to the first threshold and the browsing intensity is lower than the second threshold, control unit 133 executes the third control. FIG. 8 shows operation screen G13 which is an example of the operation screen displayed in the third control. Operation screen G13 corresponds to a case where it is determined that browsing using browsing device 20 has high relationship to the third mode of target device 30, but the degree of interest in the third mode of target device 30 is not high. Operation screen G13 includes selection button B13 in addition to selection buttons B11 and B12 displayed on operation screen G11. Selection button B13 corresponds to the third mode. In operation screen G13, unlike operation screen G12, selection button B13 is arranged below selection buttons B11 and B12. This makes the third mode less noticeable than the first and second modes. Therefore, according to operation screen G13, it is possible to propose the use of the third mode. It should be noted that in operation screen G13, selection button B13 is arranged below selection buttons B11 and B12 in order to make the third mode less noticeable than the first mode and the second mode, but it is not limited thereto. For example, the third mode may be made less noticeable than the first and second modes by changing at least one of the shapes, sizes, colors, or arrangements of selection buttons B11, B12, and B13. For example, selection buttons B11 and B12 may be displayed in a shape having better visibility or operability than selection button B13. For example, selection buttons B11 and B12 may be displayed larger than selection button B13. For example, selection buttons B11 and B12 may be displayed in a color having higher visibility than selection button B13. As an example, selection buttons B11 and B12 may be red, and selection button B13 may be black.

Generator 134 generates operation history 123, which is a history of user actions relating to target device 30, based on browsing history 121, which is a history of browsing information, and usage history 122, which is a history of usage information of target device 30. Operation history 123 may include all of browsing history 121 and usage history 122. However, in generating operation history 123, the less important browsing information or usage information may be removed from browsing history 121 and usage history 122. For example, as for the usage information included in usage history 122, only the usage information that correlates with any of the browsing information included in browsing history 121 may be left. On the contrary, as for the browsing information included in browsing history 121, only the browsing information that correlates with any of the usage information included in usage history 122 may be left. If the browsing content included in the browsing information and the mode of use included in the usage information relate to the same function of target device 30, it is considered that there is a correlation between the browsing information and the usage information. In addition, when the difference between the browsing timing included in the browsing information and the usage timing included in the usage information is small, it is considered that there is a correlation between the browsing information and the usage information. By leaving only the browsing information and the usage information that are correlated with each other, it is possible to reduce the storage capacity required for storing operation history 123.

(1-3) Operation

Hereinafter, the operation of control system 10 will be briefly described with reference to FIG. 2 and FIG. 6 to FIG. 8. It should be noted that in FIG. 2, in consideration of the viewability of the drawing, the browsing relation degree may be simply described as relation degree, and the browsing intensity may be simply described as intensity.

First, in control system 10, obtainer 131 obtains browsing information (browsing history 121) relating to browsing using browsing device 20 (S11). In addition, obtainer 131 obtains usage information (usage history 122) relating to the use of target device 30.

Next, determiner 132 determines (calculates) the browsing relation degree and the browsing intensity based on the browsing information (browsing history 121) relating to browsing using browsing device 20 (S12).

Next, control unit 133 reflects the browsing relation degree and the browsing intensity in the control of target device 30 (S13). More specifically, first, control unit 133 determines whether the browsing relation degree is greater than or equal to the first threshold (S131). If the browsing relation degree is smaller than the first threshold (S131: No), control unit 133 executes the first control (S133). In the first control, control unit 133 causes outputter 32 of target device to display operation screen G11 shown in FIG. 6. Operation screen G11 corresponds to the default operation screen.

In step S131, if the browsing relation degree is greater than or equal to the first threshold (S131: Yes), control unit 133 determines whether the browsing intensity is greater than or equal to the second threshold (S132). If the browsing intensity is greater than or equal to the second threshold (S132: Yes), control unit 133 executes the second control (S135). In the second control, control unit 133 causes outputter 32 of target device 30 to display operation screen G12 shown in FIG. 7. Operation screen G12 corresponds to an operation screen that emphasizes (recommends) the third mode.

In step S132, if the browsing intensity is lower than the second threshold (S132: No), control unit 133 executes the third control (S134). In the third control, control unit 133 causes outputter 32 of target device 30 to display operation screen G13 shown in FIG. 8. Operation screen G13 corresponds to an operation screen that presents the third mode.

After control unit 133 executes any of the first control, the second control, and the third control, generator 134 generates operation history 123 and stores it in storage 12 (S14).

(1-4) Other Specific Examples

Hereinafter, other specific aspects of the operation of control system 10 described above will be described. It should be noted that in the specific examples described below, it is assumed that the browsing intensity is greater than or equal to the second threshold. That is, the operation on the premise that the second control is executed by the user's interest will be described.

Here, as information alternative to the browsing intensity described above, information indicating that the predetermined function of target device 30 has been browsed may be determined and used from the browsing information. The case where the control of controlling target device 30 whose browsing relation degree of target device 30 is greater than or equal to the first threshold is executed without determining the browsing intensity includes a case where target device 30 is not browsed due to interest and it can happen that the control is not appropriate. On the other hand, when the browsing relation degree for the predetermined function provided in target device 30 exceeds a predetermined threshold, it can be determined that the browsing of target device 30, in particular, for the predetermined function, has been performed with interest, so that it can be said that it is appropriate to carry out the control without determining the browsing intensity. Therefore, when it can be determined that the browsing of target device 30, in particular, for the predetermined function, has been performed, the control may be performed without determining the browsing intensity. It should be noted that the browsing relation degree exceeding a predetermined threshold includes a case where a determination is simply made based on the presence or absence of browsing without setting a specific threshold. That is, in this case, the predetermined threshold is 0 and when the browsing is performed even once, the predetermined threshold is exceeded and the process shifts to the implementation of the control.

Figure 9:
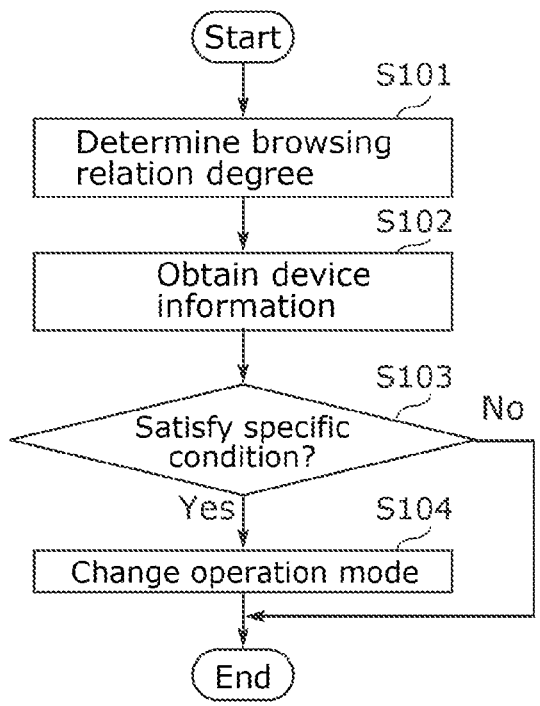
[FIG. 9]

FIG. 9 is a flowchart of a control method executed by the control system according to another specific example. As shown in FIG. 9, control system 10 first obtains browsing history 121, that is, browsing information. Based on the obtained browsing information, determiner 132 determines target device 30 and browsing relation degree between the predetermined function of target device 30 and the browsing (step S101). It should be noted that although not shown, a browsing intensity for the browsing may be determined as described above, and the determination results of both of the browsing relation degree and the browsing intensity may be used.

Based on the above determination, when the browsing relation degree of a predetermined function of target device 30 is greater than or equal to a predetermined threshold, that target device 30 can be determined to be target control device to be controlled by control unit 133. There may be a plurality of target control devices here. Here, in this specific example, it is determined whether the determined target control device is in an appropriate situation for performing control. For this reason, obtainer 131 obtains the device information on the target control device by the same method as the usage information and the like (step S102). That is, obtainer 131 is an example of the device information obtainer.

Control unit 133 determines whether the obtained device information satisfies a specific condition, thereby determining whether the target control device is in an appropriate situation for performing control (step S103). When control unit 133 determines that the device information does not satisfy a specific condition (No in step S103), control system 10 ends the process. On the other hand, when control unit 133 determines that the device information satisfies a specific condition (Yes in step S103), control unit 133 controls to set the operation screen so as to change the operation mode for executing the predetermined function of the target control device (step S104).

(1-4-1) Example of Washing Machine

Figure 10A:
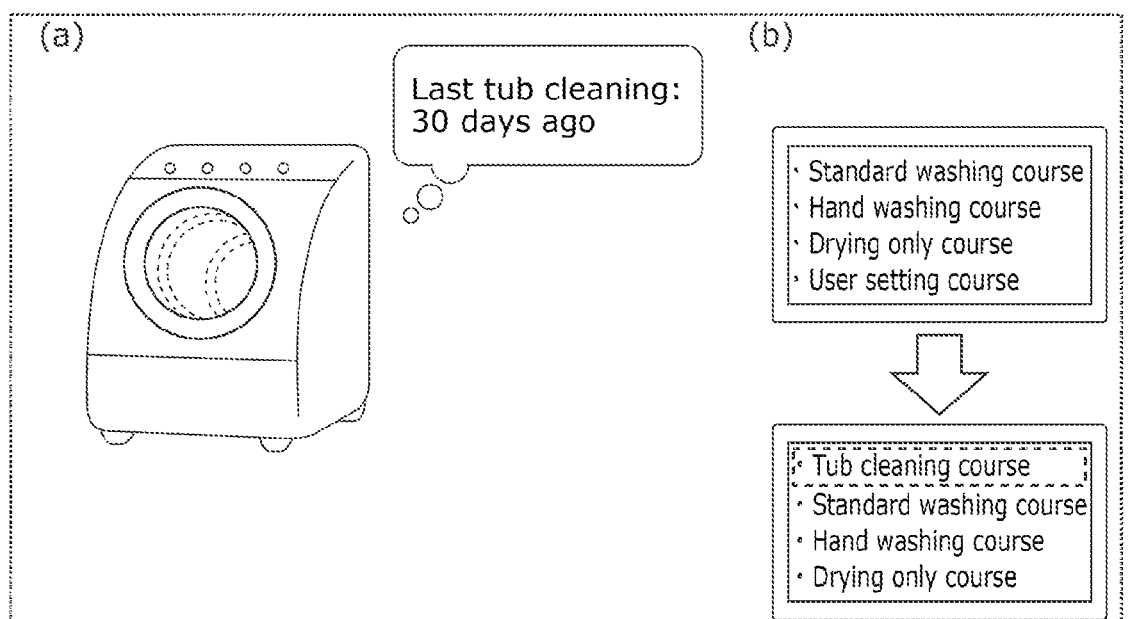
[FIG. 10A]

In the following, an operation example when the washing machine is determined as the target control device will be specifically described. FIG. 10A is a diagram illustrating control executed by a control system according to another specific example. In FIG. 10A, (a) shows information for determining a specific condition included in the device information, and (b) shows an example of an operation screen displayed when it is determined that a specific condition is satisfied.

Here, an example in such a case that the browsing by browsing device 20 is browsing relating to tub cleaning of the washing machine tub, such as information on the washing tub cleaning or information on handling the washing tub in the electronic instruction manual on the web page is shown.

As shown in (a) in FIG. 10A, obtainer 131 obtains information on the number of days elapsed since the last tub cleaning was performed as device information. Control unit 133 determines that a specific condition is satisfied when the number of days elapsed since the last tub cleaning was performed exceeds, for example, 14 days, and performs the control for setting the operation screen so as to change the operation mode for executing the predetermined function of the target control device. It should be noted that including the examples described below, the setting of such an operation screen will be described as being performed when the target control device is operated for the first time after a specific condition is satisfied.

Specifically, as shown in (b) in FIG. 10A, the operation screen is changed so as to display a button for executing cleaning of the washing tub, which was not displayed on the original operation screen (upper row), at the top position (dashed line rectangle in the figure) on the set operation screen (lower row).

In this way, control unit 133 displays the button for executing the predetermined function of the target control device at the top, and changes the operation mode so as to reduce the operation steps required to execute the predetermined function. Accordingly, the user can execute this in an easily executable operation mode at the timing when he/she is interested in the predetermined function. For example, as compared with the case where the operation mode is changed only by the device information, such as changing the operation mode only by the number of days elapsed since the last tub cleaning, it is difficult for the user to overlook the predetermined function because the user is interested.

In particular, the user often feels maintenance of target control device and the like to be troublesome unless it is the timing when the user is interested in it, and there are situations where it does not meet user needs. According to the above example, the operation mode is changed at the timing when the user is interested in the maintenance itself, and the maintenance can be easily executed, so that the maintenance timing can be accelerated, and it is also effective from the viewpoint of the maintenance of the target control device. It should be noted that the operation steps described above mean the steps for operations such as selection of options of each function layered for executing the device or scroll transition on the scroll screen.

On the other hand, if the user is allowed to voluntarily execute a predetermined function, even if a specific condition is satisfied, it may be determined that the specific condition is not satisfied. Specifically, the specific condition may be changed and set for each user. For example, it is not appropriate to display the tub cleaning course for a user who cleans the tub every 21 days, but not every 14 days, even if the browsing relating to the tub cleaning is performed. For this reason, a specific condition may be changed in consideration of the history of predetermined functions performed by the user in the past. In addition, the user's family structure, lifestyle, and the like may be estimable from the amount and frequency of laundry, and device information obtained from other linked device and the like. For example, in the case of having a large family structure, it is better to perform the above-described tub cleaning and the like at shorter intervals. On the other hand, in the case of a single family structure, the above-described tub cleaning and the like can be tolerated even if they are performed every longer period. For this reason, as a specific condition, a condition set in consideration of the user's family structure and lifestyle estimated from the device information may be applied.

In addition, in order to reduce the operation steps, in the above example, on the operation screen on which the execution buttons for executing the predetermined function and the other functions of the target control device are displayed in the display order, an example of changing the display order so that the execution button for the predetermined function is placed higher than the execution buttons for the other functions in the display order has been described. In such a case, for example, the execution button of a predetermined function may be displayed at the highest position as in the above example, or may be displayed at a position that is higher than some of the other functions and lower than some of the other functions. For example, since the example in the figure has a configuration in which four functions are displayed on one screen, even if it is not at the top position, if it is in the second, third, or fourth position, the effect similar to the above can be achieved.

It should be noted that in this example, an example of reducing the operation steps has been described, but the user may be interested in a predetermined function that is not preferable to be executed by the user. In such a case, the operation steps may be increased instead of decreasing the operation steps. For example, there is a predetermined function for setting for making settings on the manufacturer side of the target control device, which adversely affects the operation of the target control device if the parameter or the like is mistaken. When determiner 133 determines that the user is interested in such a predetermined function, the operation steps required to execute the predetermined function may be increased so that the predetermined function cannot be easily executed.

The above explanation of operation steps and the like is appropriately applied to each specific example described below.

Figure 10B:
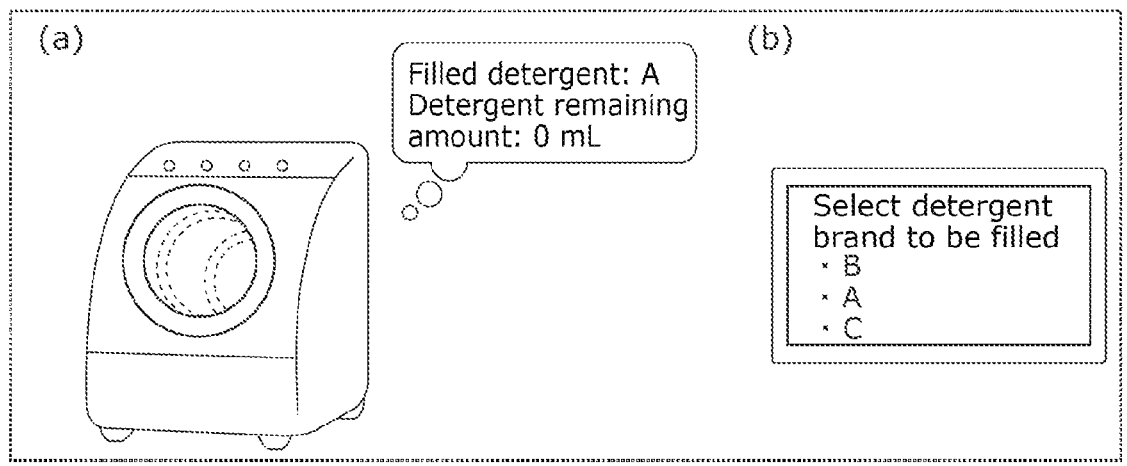
[FIG. 10B]

FIG. 10B is a second diagram illustrating the control executed by the control system according to another specific example. In FIG. 10B, (a) shows information for determining a specific condition included in the device information, and (b) shows an example of an operation screen displayed when it is determined that a specific condition is satisfied.

Here, an example in such a case that the browsing by browsing device 20 is browsing relating to the information and the like relating to the brand of the laundry detergent is shown. In particular, here, it will be described assuming that the information on the laundry detergent of the brand "B" has been browsed.

As shown in (a) in FIG. 10B, obtainer 131 obtains information on the brand of the laundry detergent currently in use (here, "A") and the remaining amount of the laundry detergent (that is, the remaining amount of the laundry detergent filled in the laundry detergent tub) as device information. Control unit 133 determines that the brand "B" to be browsed is different from the brand "A" set as the brand of the laundry detergent to be filled and that a specific condition is satisfied when the remaining amount of the filled laundry detergent is 0 mL (or the remaining amount with which laundry cannot be performed next time), and controls to set the operation screen so as to change the operation mode for executing a predetermined function of the target control device.

Specifically, as shown in (b) in FIG. 10B, the brand "B" is displayed at the highest position on the operation screen. Normally, the brand "A" that has been selected in the past is displayed at the top, but since there is a high possibility that the brand "B" will be selected, the display order has been changed. Here, the predetermined function is a function for changing the brand of the laundry detergent, which is one of the parameters when the washing machine, which is the target control device, operates. That is, the brand of laundry detergent is an example of operating parameters in a washing machine.

Figure 10C:
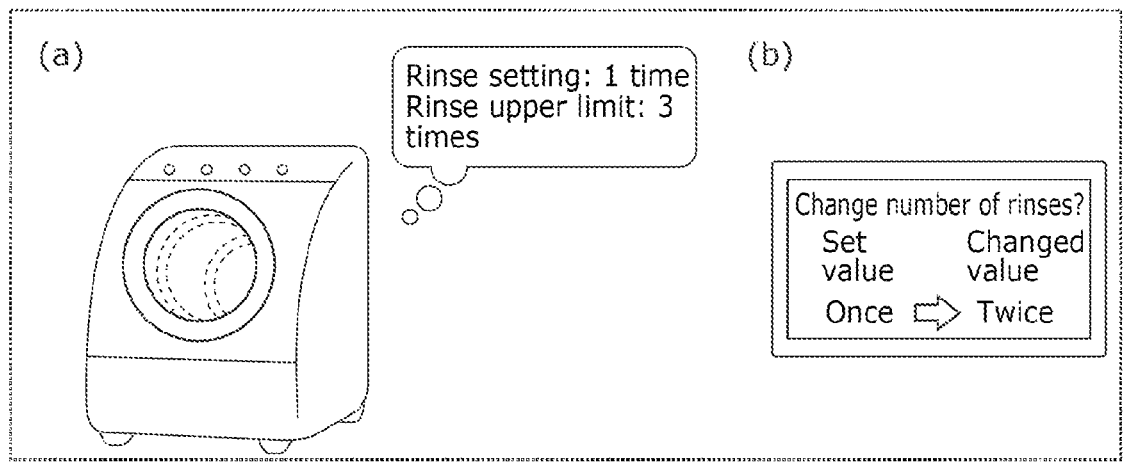
[FIG. 10C]

FIG. 10C is a third diagram illustrating the control executed by the control system according to another specific example. In FIG. 10C, (a) shows information for determining a specific condition included in the device information, and (b) shows an example of an operation screen displayed when it is determined that the specific condition is satisfied.

Here, an example in such a case that the browsing by browsing device 20 is browsing relating to increasing the number of rinses of the washing machine, such as information on pollen countermeasures or information on unwashed detergent during washing is shown.

As shown in (a) in FIG. 10C, obtainer 131 obtains information on the number of rinses set as device information and information on the upper limit of the number of rinses that can be set. Control unit 133 determines that a specific condition is satisfied when the set number of rinses is smaller than the upper limit of the number of rinses that can be set, and performs a control of setting the operation screen so as to change the operation mode for executing the predetermined function of the target control device.

Specifically, as shown in (b) in FIG. 10C, a screen for executing a predetermined function for increasing the number of rinses is displayed, for example, by displaying it as an interrupt on a screen being operated. In this way, by displaying, as an interrupt, the operation screen including the execution button for executing the predetermined function of the target control device on the screen being operated, the operation steps required to execute the predetermined function can also be reduced. In addition, here, the predetermined function is a function for changing the number of rinses, which is one of the parameters when the washing machine, which is the target control device, operates. That is, the number of rinses is an example of an operating parameter in a washing machine.

Figure 10D:
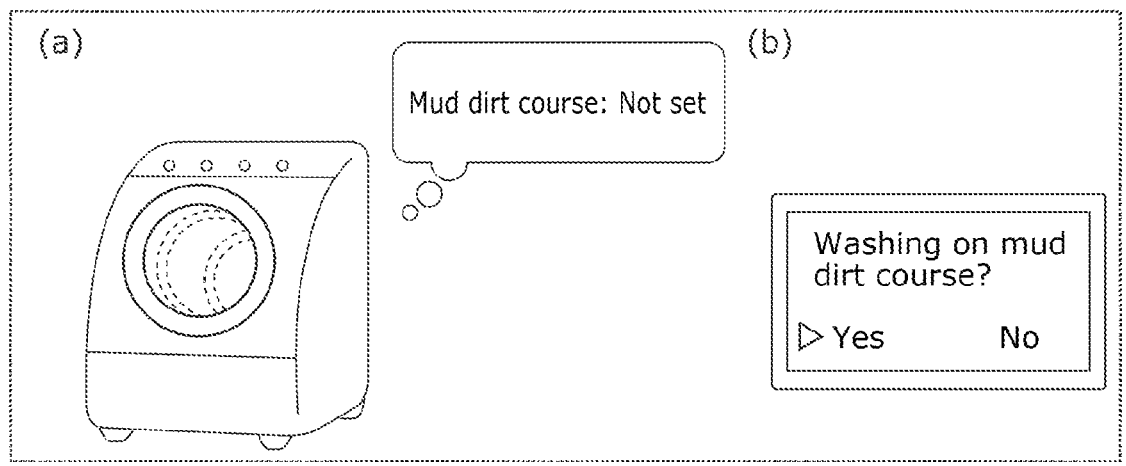
[FIG. 10D]

FIG. 10D is a fourth diagram illustrating the control executed by the control system according to another specific example. In FIG. 10D, (a) shows information for determining a specific condition included in the device information, and (b) shows an example of an operation screen displayed when it is determined that the specific condition is satisfied.

Here, an example in such a case that the browsing by browsing device 20 is browsing relating to the information on the function for removing mud dirt mounted on the washing machine, and the like is shown.

As shown in (a) in FIG. 10D, obtainer 131 obtains information on the setting state (here, not set, that is, the setting not to be used) of the function for removing mud dirt as device information. Control unit 133 determines that a specific condition is satisfied when the setting state is not set, and performs a control of setting the operation screen so as to change the operation mode for executing the predetermined function of the target control device.

Specifically, as shown in (b) in FIG. 10D (b), a screen for executing washing using the function for removing mud dirt is displayed, for example, by displaying it as an interrupt on the screen being operated.

Figure 10E:
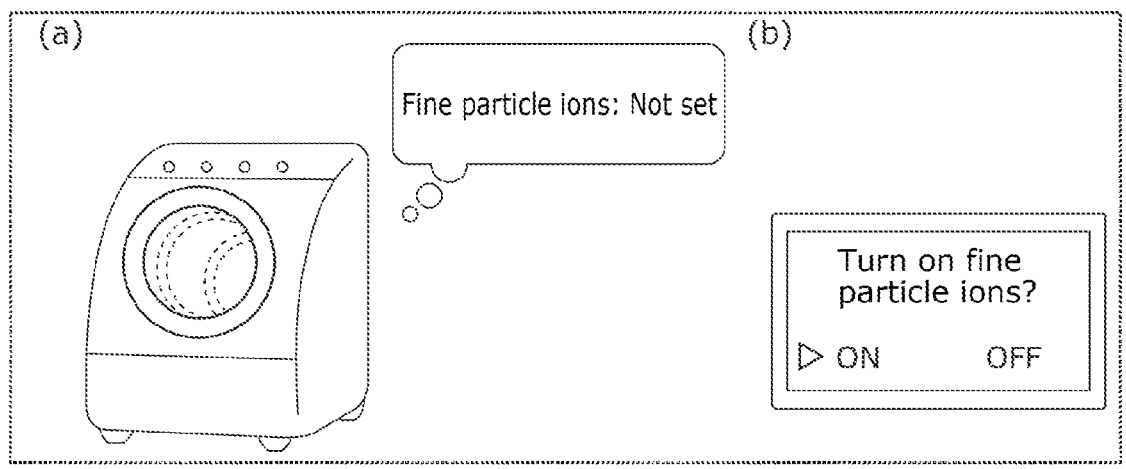
[FIG. 10E]

FIG. 10E is a fifth diagram illustrating the control executed by the control system according to another specific example. In FIG. 10E, (a) shows information for determining a specific condition included in the device information, and (b) shows an example of an operation screen displayed when it is determined that the specific condition is satisfied.

Here, an example in such a case that the browsing by browsing device 20 is browsing relating to the information on the function of generating fine particle ions mounted on the washing machine, and the like is shown.

As shown in (a) in FIG. 10E, obtainer 131 obtains information on the setting state (here, not set, that is, the setting not to be used) of the function for generating fine particle ions as device information. Control unit 133 determines that a specific condition is satisfied when the setting state is not set, and performs a control of setting the operation screen so as to change the operation mode for executing the predetermined function of the target control device.

Specifically, as shown in (b) in FIG. 10E, a screen for turning on the function of generating fine particle ions is displayed, for example, by displaying it as an interrupt on the screen being operated.

Figure 10F:
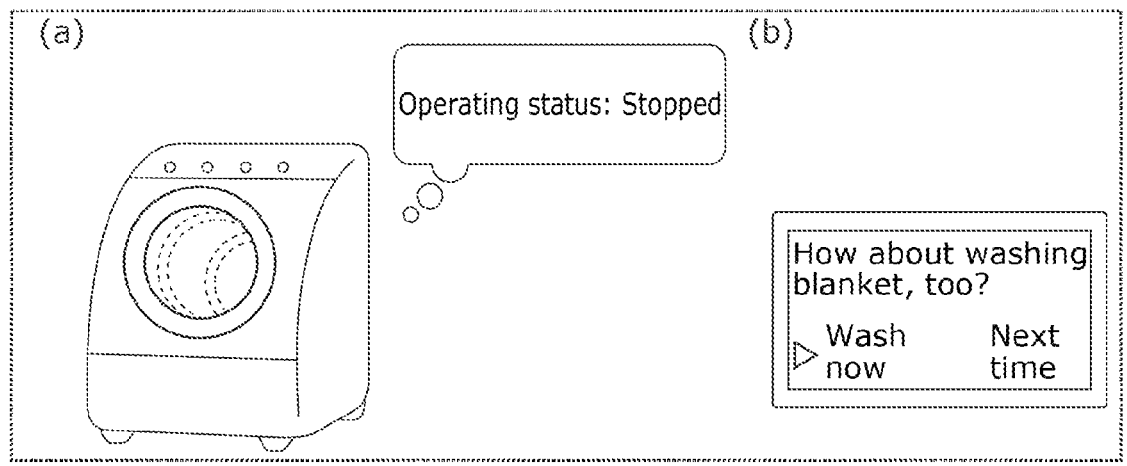
[FIG. 10F]

FIG. 10F is a sixth diagram illustrating the control executed by the control system according to another specific example. In FIG. 10F, (a) shows information for determining a specific condition included in the device information, and (b) shows an example of an operation screen displayed when it is determined that the specific condition is satisfied.

Here, an example in such a case that the browsing by browsing device 20 is browsing relating to the information on washing laundry that is not washed on a daily basis, such as blankets and carpets is shown.

As shown in (a) in FIG. 10F, obtainer 131 obtains information on the operating state of the washing machine (here, stopped) as device information. Control unit 133 determines that a specific condition is satisfied when the operation state is stopped, and performs a control of setting the operation screen so as to change the operation mode for executing the predetermined function of the target control device.

Specifically, as shown in (b) in FIG. 10F, a screen for prompting the user to wash the laundry (here, a blanket) to be browsed that is not to be washed on a daily basis is displayed, for example, by displaying it as an interrupt on the screen being operated by the user. In this way, the specific condition may include that the operation of the target control device is stopped.

Figure 10G:
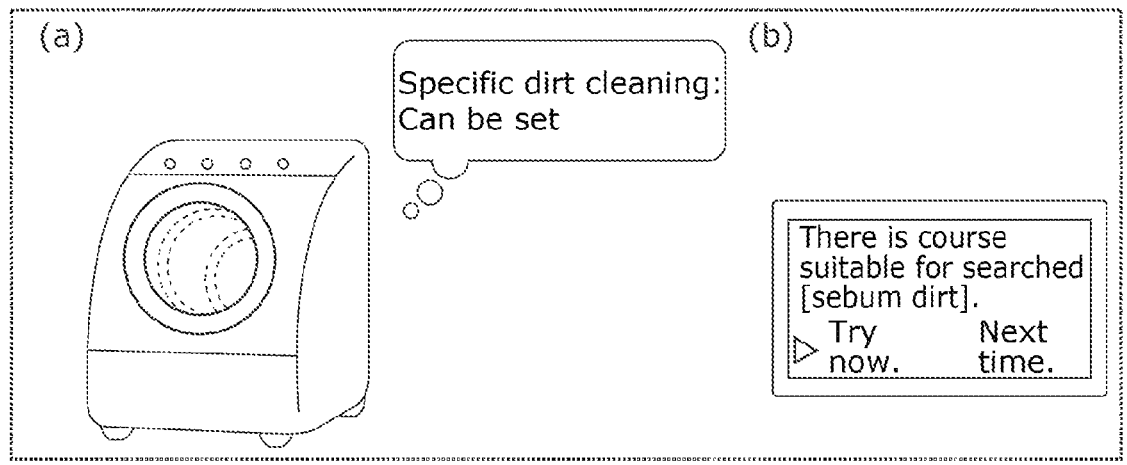
[FIG. 10G]

FIG. 10G is a seventh diagram illustrating the control executed by the control system according to another specific example. In FIG. 10G, (a) shows information for determining a specific condition included in the device information, and (b) shows an example of an operation screen displayed when it is determined that the specific condition is satisfied.

Here, an example in such a case that the browsing by browsing device 20 is browsing relating to the information on a specific dirt such as sebum dirt is shown.

As shown in (a) in FIG. 10G, obtainer 131 obtains information on whether a specific dirt of the type to be browsed is included in the specific dirt that can be set to be washed in the washing machine as device information. Control unit 133 determines that a specific condition is satisfied when the specific dirt of the type to be browsed is included, and performs a control of setting the operation screen so as to change the operation mode for executing the predetermined function of the target control device.

Specifically, as shown in (b) in FIG. 10G, a screen for prompting the user to apply a setting for washing off specific dirt (sebum dirt) to be browsed is displayed, for example, by displaying it as an interrupt on the screen being operated by the user. In particular, as shown in the figure, an explanatory note such as "suitable for the searched sebum dirt" may be displayed to indicate that the specific dirt is obtained from the result of browsing by the user. Accordingly, the user can understand that the proposal is made by the linkage between browsing device 20 and target device 30. In addition, if the user has forgotten to browse for a specific dirt, this can be reminded, so that it is possible to prevent, for example, forgetting to wash the laundry with the specific dirt. In this way, in the changed operation mode, if it is effective to display that the change in the operation mode is based on the browsing by the user, this can also be performed.

(1-4-2) Example in an Air Conditioner

Figure 11A:
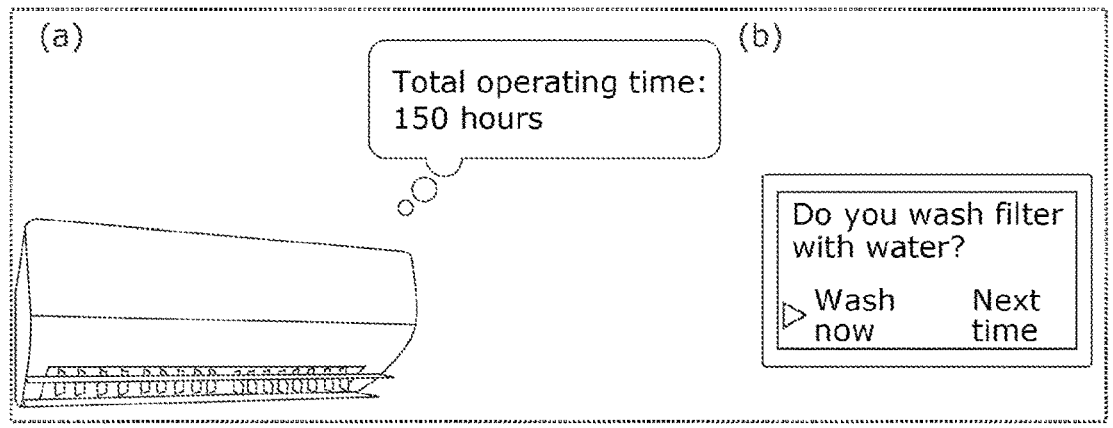
[FIG. 11A]

In the following, an operation example when an air conditioner is determined as a target control device will be specifically described. FIG. 11A is an eighth diagram illustrating the control executed by the control system according to another specific example. In FIG. 11A, (a) shows information for determining a specific condition included in the device information, and (b) shows an example of an operation screen displayed when it is determined that the specific condition is satisfied.

Here, an example in such a case that the browsing by browsing device 20 is browsing relating to the filter cleaning of the air conditioner, such as the information on the filter cleaning or the information on the handling of the filter in the electronic instruction manual on the web page is shown.

As shown in (a) in FIG. 11A, obtainer 131 obtains information on the total operating time since the last filter cleaning was performed as device information. Control unit 133 determines that a specific condition is satisfied when the total operating time since the last filter cleaning was performed exceeds, for example, 100 hours, and performs a control of setting the operation screen so as to change the operation mode for executing the predetermined function of the target control device.

Specifically, as shown in (b) in FIG. 11A, a screen for starting cleaning of the filter is displayed, for example, by displaying it as an interrupt on the screen being operated. In this way, the specific condition may include that the target control device is operated after the first period has elapsed from the timing when the predetermined function was executed in the past. It should be noted that the first period may be an elapsed time, a total operating time, or the like. Furthermore, it may be inappropriate for such control to be performed after a long period of time has passed since browsing. That is, even if the display for starting the filter cleaning based on the browsing is performed after one month has passed from the browsing, the user's interest in the filter cleaning may be diminished. For this reason, for example, the specific condition may include that it is within the second period defined by a period such as one day, three days, and one week from the timing of browsing.

In addition, regarding the above second period, the calculation of the reaction score and the identification of the user will be described. For example, when one target control device is used by a plurality of people, specific conditions may differ for each individual. Therefore, by setting a period from browsing to operating the target control device as a score (reaction score) and creating a database of scores for each individual as described above, it may be identified which user on the database the user is using the period from browsing to operating the target control device.

Figure 11B:
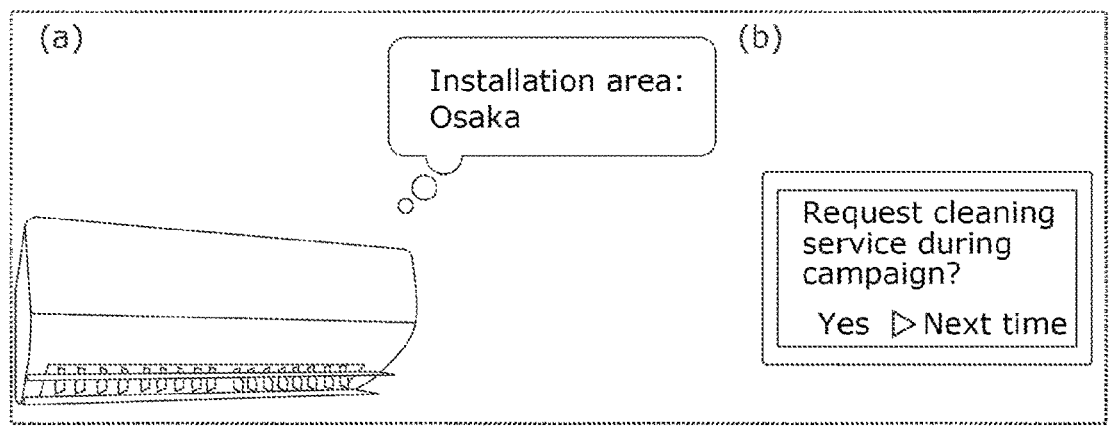
[FIG. 11B]

FIG. 11B is a ninth diagram illustrating the control executed by a control system according to another specific example. In FIG. 11B, (a) shows information for determining a specific condition included in the device information, and (b) shows an example of an operation screen displayed when it is determined that the specific condition is satisfied.

Here, an example in such a case that the browsing by browsing device 20 is browsing relating to the information on the cleaning service of the air conditioner is shown.

As shown in (a) in FIG. 11B, obtainer 131 obtains information on the area where the air conditioner is installed as device information. Control unit 133 determines that a specific condition is satisfied when the area where the air conditioner is installed (for example, Osaka) corresponds to a predetermined area (for example, Kinki region), and performs a control of setting the operation screen so as to change the operation mode for executing the predetermined function of the target control device.

Specifically, as shown in (b) in FIG. 11B, a screen for requesting a cleaning service is displayed, for example, by displaying it as an interrupt on the screen being operated. In this way, the specific condition may include that the area where the target control device is installed corresponds to a predetermined area. Accordingly, for example, it is possible to arrange a maintenance company for the target control device that is developing services in a predetermined area, and as shown in the figure, it is also possible to present information such as campaigns being carried out in the predetermined area together.

Figure 11C:
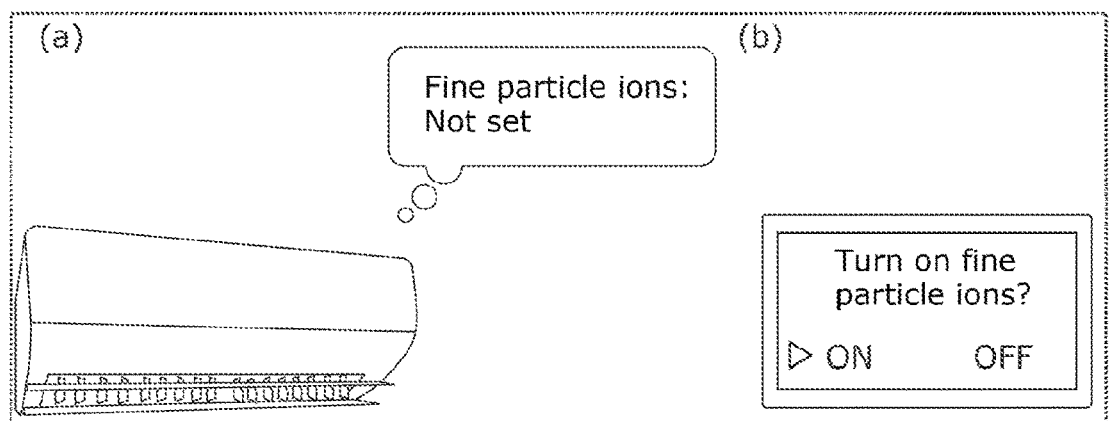
[FIG. 11C]

FIG. 11C is a tenth diagram illustrating the control executed by a control system according to another specific example. In FIG. 11C, (a) shows information for determining a specific condition included in the device information, and (b) shows an example of an operation screen displayed when it is determined that the specific condition is satisfied.

Here, an example in such a case that the browsing by browsing device 20 is browsing relating to the function of generating fine particle ions mounted on the air conditioner, such as information on pollen countermeasures is shown.

As shown in (a) in FIG. 11C, obtainer 131 obtains information on the setting state (here, not set, that is, the setting not to be used) of the function of generating fine particle ions as device information. Control unit 133 determines that a specific condition is satisfied when the setting state is not set, and performs a control of setting the operation screen so as to change the operation mode for executing the predetermined function of the target control device.

Specifically, as shown in (b) in FIG. 11C, a screen for turning on the function of generating fine particle ions is displayed, for example, by displaying it as an interrupt on the screen being operated.

Figure 11D:
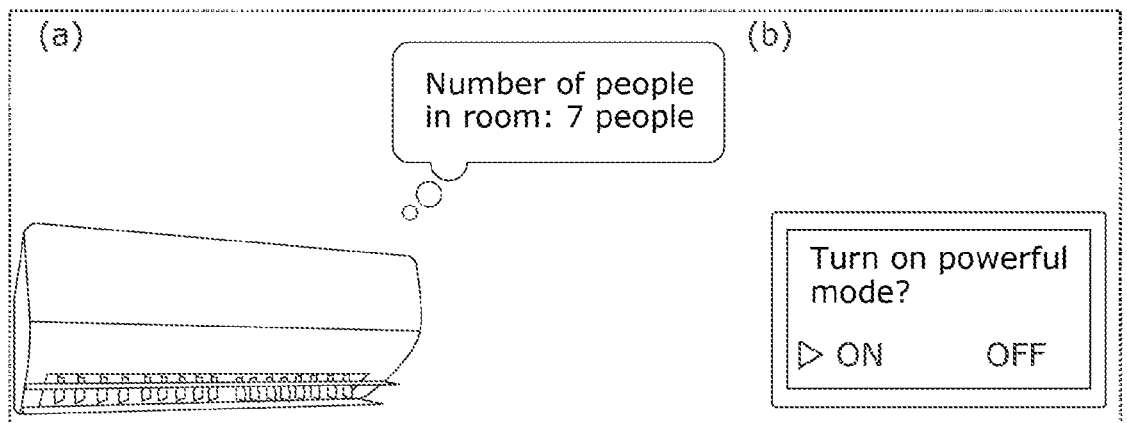
[FIG. 11D]

FIG. 11D is an eleventh diagram illustrating the control executed by the control system according to another specific example. In FIG. 11D, (a) shows information for determining a specific condition included in the device information, and (b) shows an example of an operation screen displayed when it is determined that the specific condition is satisfied.

Here, an example in such a case that the browsing by browsing device 20 is browsing relating to the fact that it is assumed that a large number of people will use the space in which the target control device is installed, such as information on a home party is shown.

As shown in (a) in FIG. 11D, obtainer 131 obtains information on the number of people in the room as device information. Control unit 133 determines that a specific condition is satisfied when the number of people in the room (for example, 7 people) exceeds a predetermined number of people (for example, 5 people), and performs a control of setting the operation screen so as to change the operation mode for executing the predetermined function of the target control device.

Specifically, as shown in (b) in FIG. 11D, a screen for setting the operation in the powerful mode to ON is displayed, for example, by displaying it as an interrupt on the screen being operated. In air-conditioning related device, the operating efficiency may decrease depending on the number of people in the room. As described above, it is effective to present a high output operation mode when the number of people in the room is large. Therefore, the specific condition may include that the detection result indicating that the environmental state (the above-mentioned number of people in the room) detected by a detector such as a motion sensor is an environmental state suitable for the operation of a predetermined function (here, the operation in the powerful mode) has been detected.

Figure 11E:
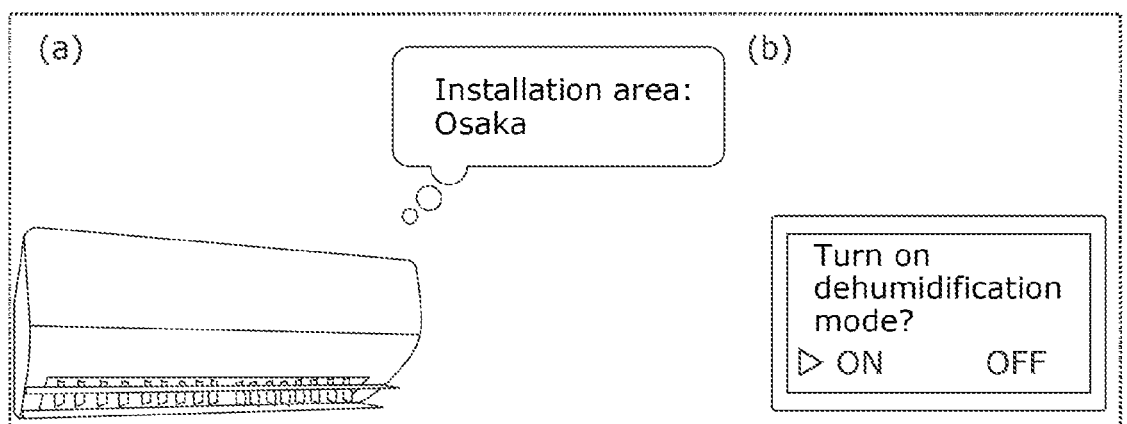
[FIG. 11E]

FIG. 11E is a twelfth diagram illustrating the control executed by the control system according to another specific example. In FIG. 11E, (a) shows information for determining a specific condition included in the device information, and (b) shows an example of an operation screen displayed when it is determined that the specific condition is satisfied.

Here, an example in such a case that the browsing by browsing device 20 is browsing relating to the dehumidifying function of the air conditioner, such as information on measures against humidity is shown.

As shown in (a) in FIG. 11E, obtainer 131 obtains information on the area where the air conditioner is installed as device information. Control unit 133 determines that a specific condition is satisfied when the area where the air conditioner is installed (for example, Osaka) corresponds to an area having predetermined weather where an increase in humidity such as rainfall or high humidity is expected, and performs a control of setting the operation screen so as to change the operation mode for executing the predetermined function of the target control device.

Specifically, as shown in (b) in FIG. 11E, a screen for operating the dehumidification mode is displayed, for example, by displaying it as an interrupt on the screen being operated. In this way, the specific condition may include that the weather in the area where the target control device is installed is predetermined weather. This makes it possible to perform control according to the user's interest, especially in the air-conditioning-related device, taking the local weather and the like into consideration.

Figure 11F:
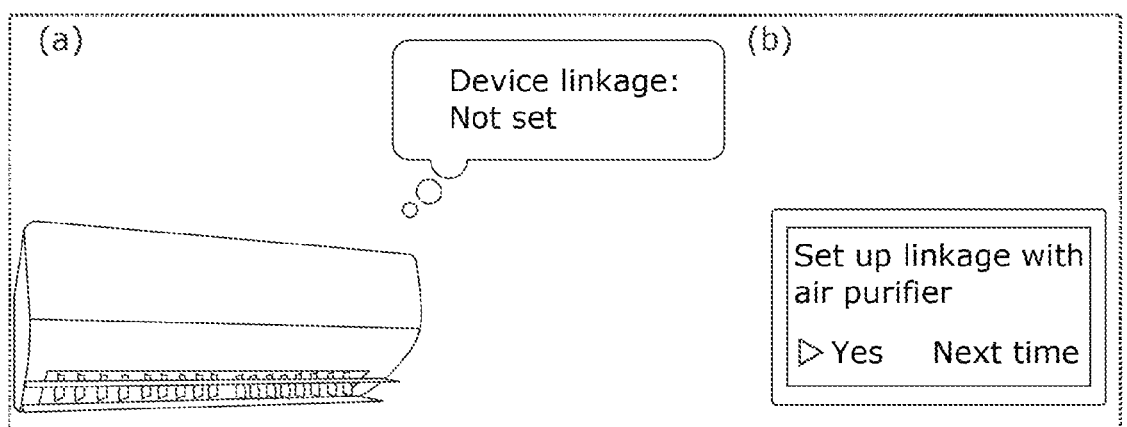
[FIG. 11F]

FIG. 11F is a thirteenth diagram illustrating the control executed by the control system according to another specific example. In FIG. 11F, (a) shows information for determining a specific condition included in the device information, and (b) shows an example of an operation screen displayed when it is determined that the specific condition is satisfied.

Here, an example in such a case that the browsing by browsing device 20 is browsing relating to device linkage of the air conditioner, such as information on the linkage function between the air conditioner and other device (for example, an air purifier) is shown.

As shown in (a) in FIG. 11F, obtainer 131 obtains information on the setting state of the device linkage function of the air conditioner as device information. Control unit 133 determines that a specific condition is satisfied when the setting state of the device linkage function of the air conditioner is not set, and performs a control of setting the operation screen so as to change the operation mode for executing the predetermined function of the target control device.

Specifically, as shown in (b) in FIG. 11F, a screen for starting the device linkage setting is displayed, for example, by displaying it as an interrupt on the screen being operated.

Figure 11G:
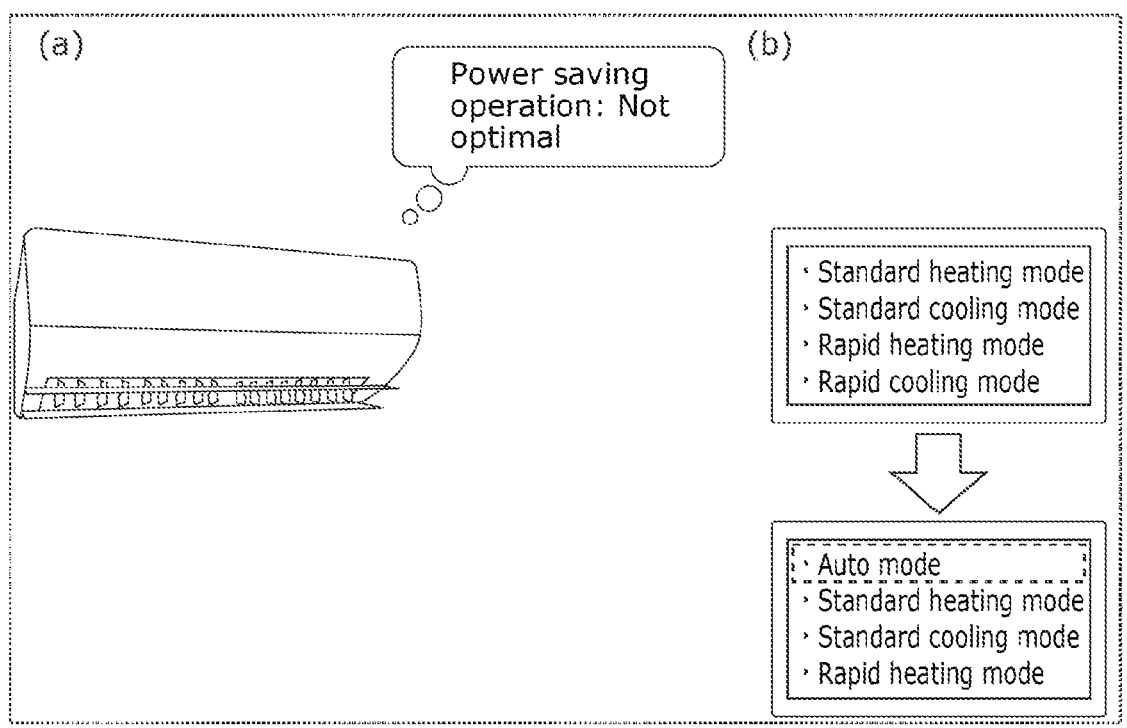
[FIG. 11G]

FIG. 11G is a fourteenth diagram illustrating the control executed by the control system according to another specific example. In FIG. 11G, (a) shows information for determining a specific condition included in the device information, and (b) shows an example of an operation screen displayed when it is determined that the specific condition is satisfied.

Here, an example in such a case that the browsing by browsing device 20 is browsing relating to operating the air conditioner in an energy efficient manner, such as information on energy saving (power saving) setting is shown.

As shown in (a) in FIG. 11G, obtainer 131 obtains information, as device information, on whether the operating state of the air conditioner is optimal from the viewpoint of power saving setting. Control unit 133 determines that a specific condition is satisfied when it is not optimal from the viewpoint of power saving setting, and performs a control of setting the operation screen so as to change the operation mode for executing the predetermined function of the target control device.

Specifically, as shown in (b) in FIG. 11G, the operation screen is changed so as to display a button for executing the automatic mode, which was not displayed on the original operation screen (upper row), at the top position (dashed line rectangle in the figure) on the set operation screen (lower row).

(1-4-3) Example in a Microwave Oven

Figure 12A:
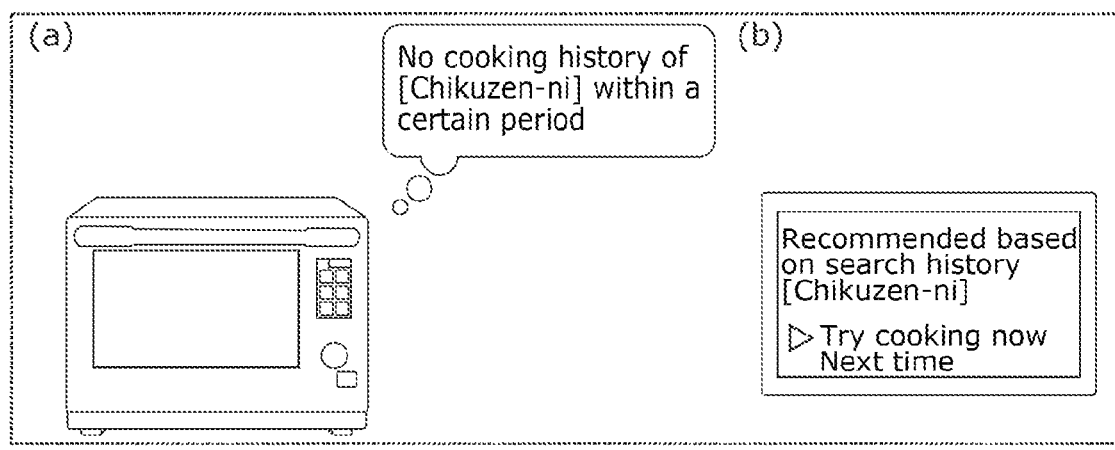
[FIG. 12A]

In the following, an operation example when a microwave oven is determined as a target control device will be specifically described. FIG. 12A is a fifteenth diagram illustrating the control executed by the control system according to another specific example. In FIG. 12A, (a) shows information for determining a specific condition included in the device information, and (b) shows an example of an operation screen displayed when it is determined that the specific condition is satisfied.

Here, an example in such a case that the browsing by browsing device 20 is browsing relating to the information of a predetermined menu (here, Chikuzen-ni (braised chicken and vegetables)) to be cooked by the microwave oven, and the like is shown.

As shown in (a) in FIG. 12A, obtainer 131 obtains information, as device information, on whether there is a history of cooking Chikuzen-ni within a certain period from browsing. Control unit 133 determines that a specific condition is satisfied when there is no history of cooking Chikuzen-ni within a certain period of time since browsing, and performs a control of setting the operation screen so as to change the operation mode for executing the predetermined function of the target control device.

Specifically, as shown in (b) in FIG. 12A, a screen prompting the user to cook Chikuzen-ni based on the search is displayed, for example, by displaying it as an interrupt on the screen being operated.

Figure 12B:
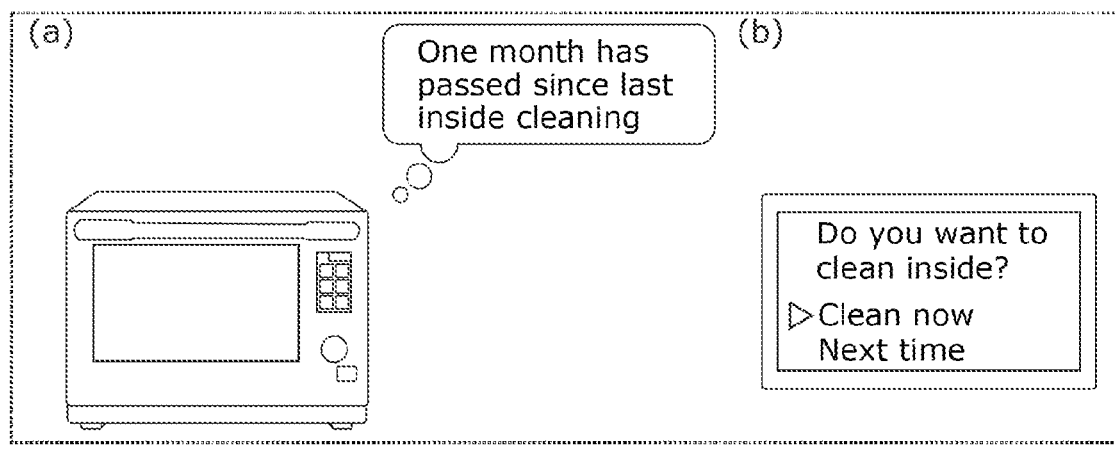
[FIG. 12B]

FIG. 12B is a sixteenth diagram illustrating the control executed by the control system according to another specific example. In FIG. 12B, (a) shows information for determining a specific condition included in the device information, and (b) shows an example of an operation screen displayed when it is determined that the specific condition is satisfied.

Here, an example in such a case that the browsing by browsing device 20 is browsing relating to the inside cleaning of the microwave oven, such as the information on the inside cleaning of the microwave oven or the information on handling the inside of the microwave oven in the electronic instruction manual on the web page is shown.

As shown in (a) in FIG. 12B, obtainer 131 obtains information on the number of days elapsed since the last inside cleaning was performed as device information. Control unit 133 determines that a specific condition is satisfied when the number of days elapsed since the last tub cleaning was performed exceeds, for example, 14 days, and performs a control of setting the operation screen so as to change the operation mode for executing the predetermined function of the target control device.

Specifically, as shown in (b) in FIG. 12B, a screen for starting the inside cleaning is displayed, for example, by displaying it as an interrupt on the screen being operated by the user.

Figure 12C:
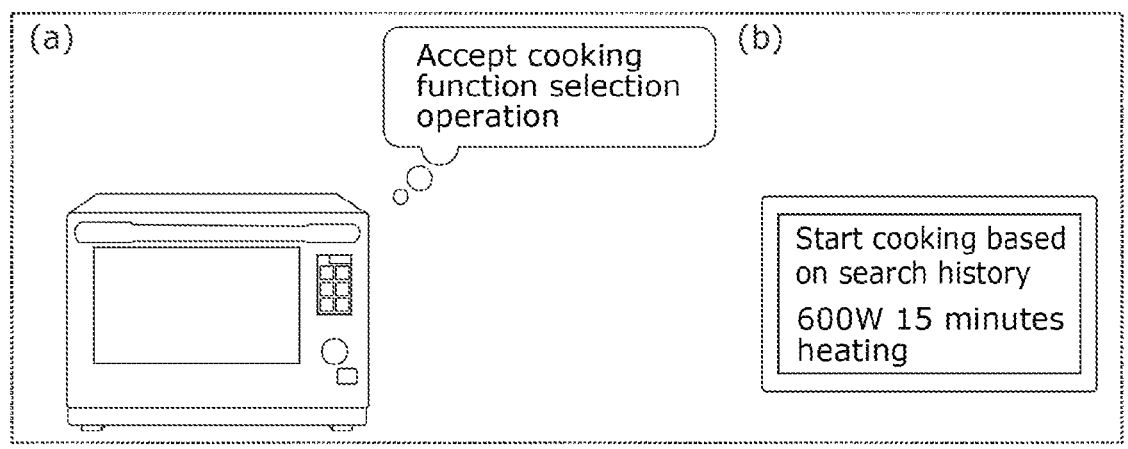
[FIG. 12C]

FIG. 12C is a seventeenth diagram illustrating the control executed by the control system according to another specific example. In FIG. 12C, (a) shows information for determining a specific condition included in the device information, and (b) shows an example of an operation screen displayed when it is determined that the specific condition is satisfied.

Here, an example in such a case that the browsing by browsing device 20 is browsing relating to the information of a predetermined menu (here, Chikuzen-ni) to be cooked by the microwave oven, and the like is shown.

As shown in (a) in FIG. 12C, obtainer 131 obtains information, as device information, on whether the operation of selecting the cooking function has been accepted within a certain period since browsing. Control unit 133 determines that a specific condition is satisfied when the operation of selecting the cooking function is received within a certain period since the browsing, and performs a control of setting the operation screen so as to change the operation mode for executing the predetermined function of the target control device.

Specifically, as shown in (b) in FIG. 12C, a screen prompting the user to start cooking after automatically inputting operating parameters such as an output value and cooking time for cooking Chikuzen-ni based on a search is displayed, for example, by displaying it as an interrupt on the screen being operated.

Figure 12D:
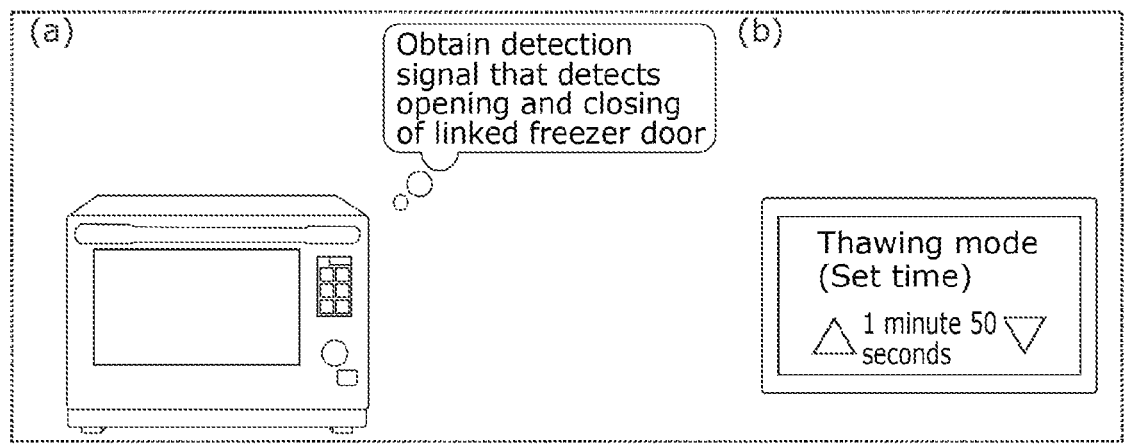
[FIG. 12D]

FIG. 12D is an eighteenth diagram illustrating the control executed by the control system according to another specific example. In FIG. 12D, (a) shows information for determining a specific condition included in the device information, and (b) shows an example of an operation screen displayed when it is determined that the specific condition is satisfied.

Here, an example in such a case that the browsing by browsing device 20 is browsing indicating that the frozen food has been purchased on a predetermined website is shown.

As shown in (a) in FIG. 12D, obtainer 131 obtains information, as device information, on whether a signal for detecting the opening/closing of the door is received from the freezer linked with the microwave oven by the device linkage. Control unit 133 determines that a specific condition is satisfied when receiving a signal for detecting the opening/closing of the door from the freezer linked with the microwave oven, and performs a control of setting the operation screen so as to change the operation mode for executing the predetermined function of the target control device.

Specifically, as shown in (b) in FIG. 12D, an interrupt display to prompt the user to start cooking in the thawing mode is displayed, for example, by displaying it as an interrupt on the screen being operated by the user. In this way, the specific condition may include that an accept signal indicating that a specific operation (here, opening/closing of the door) has been received in the linked device (for example, a freezer) with which the target control device (for example, a microwave oven) links has been obtained. In addition to this example, the accept signal may be obtained from the application on the information terminal with which the target control device links. For example, the same control as described above is performed by operating a button such as "use this frozen food" on the application for the purpose of inventory management of foodstuffs linked with the microwave oven as described above. In this way, the linked device does not necessarily have to be a device relating to cooking food, and may include a device such as an information terminal on which a specific application as exemplified is executed. In addition, the specific operation does not necessarily have to be an operation relating to cooking food in the same manner.

(1-4-4) Summary of Other Specific Examples

As described above, control system 10 according to another specific example includes: a determiner that determines, based on browsing information on browsing using browsing device 20, a browsing relation degree indicating relationship between (i) target device 30 and a predetermined function of target device 30 and (ii) the browsing; an device information obtainer that obtains device information on a target control device that is target device 30 determined based on the browsing relation degree of the browsing; and control unit 133 that changes an operation mode for executing the predetermined function of the target control device when the device information obtained satisfies a specific condition.

Such control system 10 can change the operation mode for executing the predetermined function based on the browsing relating to the predetermined function of target device 30. At this time, by conditioning that the specific condition is satisfied based on the device information, a situation where the execution of a predetermined function is appropriate or inappropriate in the target control device, and an operation mode for executing the predetermined function when the user is interested in the predetermined function are changed. Accordingly, for example, if the execution of the predetermined function is in an appropriate situation in the target control device, it is possible to make the predetermined function executable more easily. On the other hand, for example, if the execution of the predetermined function is in an inappropriate situation in the target control device, it is possible to make the execution of the predetermined function difficult. In this way, the usability of, in particular, a predetermined function of the target control device is improved based on the user's browsing.

In addition, for example, the target control device may be target device 30 whose browsing relation degree is greater than or equal to the threshold.

Accordingly, the target control device can be determined from target device 30 by the threshold determination of the browsing relation degree.

In addition, for example, control unit 133 may reduce the operation steps required to execute a predetermined function of the target control device.

Accordingly, it becomes easy to execute the predetermined function, so that the execution of the predetermined function can be promoted. That is, when the user is interested in a predetermined function and the execution of the predetermined function is appropriate in the target control device, and the like, the execution of the predetermined function is promoted, so that the usability of the target control device is improved.

In addition, for example, control unit 133 may change the display order so that the execution button for the predetermined function is placed higher than the execution buttons for the other functions in the display order on an operation screen on which the execution buttons for executing the predetermined function and the other functions of the target control device are displayed in the display order.

Accordingly, on the operation screen on which a plurality of functions of the target control device are listed, the displaying position of the predetermined function is moved above the positions of the other functions, and the predetermined function can be easily executed.

In addition, for example, control unit 133 may cause an operation screen including the execution button for executing a predetermined function of the target control device to be displayed as an interrupt on the screen being operated.

Accordingly, the predetermined function can be easily executed from the screen displayed as an interrupt.

In addition, for example, control unit 133 may increase the operation steps required to execute a predetermined function of the target control device.

Accordingly, it is possible to make it difficult to execute the predetermined function, so that it is possible to suppress the execution of the predetermined function. That is, when the user is interested in the predetermined function and the execution of the predetermined function is inappropriate in the target control device, and the like, the execution of the predetermined function is suppressed, so that the usability of the target control device is improved.

In addition, for example, the predetermined function may include changing the operating parameters when the target control device operates.

Accordingly, it is possible to change the operating parameters in the operation of the target control device by executing the predetermined function.

In addition, for example, a specific condition may include that the execution of a predetermined function is set to off.

Accordingly, when the condition that the execution of the predetermined function is turned off is satisfied, the operation mode for executing the predetermined function can be changed.

In addition, for example, the specific condition may include that the operation of the target control device is stopped.

Accordingly, when the condition that the operation of the target control device is stopped is satisfied, the operation mode for executing the predetermined function can be changed.

In addition, for example, the specific condition may include that the target control device is operated after the first period has elapsed from the timing when the predetermined function was executed in the past.

Accordingly, when the condition that the target control device is operated after the first period has elapsed from the timing when the predetermined function was executed in the past is satisfied, the operation mode for executing the predetermined function can be changed.

In addition, for example, the specific condition may include that it is within the second period from the timing of browsing.

Accordingly, when the condition that it is within the second period from the timing of browsing is satisfied, the operation mode for executing the predetermined function can be changed.

In addition, for example, the specific condition may include that the area where the target control device is installed corresponds to a predetermined area.

Accordingly, when the condition that the area where the target control device is installed corresponds to the predetermined area is satisfied, the operation mode for executing the predetermined function can be changed.

In addition, for example, the specific condition may include that the weather in the area where the target control device is installed is predetermined weather.

Accordingly, when the condition that the weather in the area where the target control device is installed is the predetermined weather, the operation mode for executing the predetermined function can be changed.

In addition, for example, the specific condition may include that an accept signal indicating that a specific operation has been accepted in the linked device with which the target control device links has been received.

Accordingly, it is possible to change the operation mode for executing a predetermined function when the condition that an accept signal indicating that a specific operation has been received in the linked device with which the target control device links is satisfied.

In addition, for example, the specific condition may include that a detection result indicating that the environmental state detected by the detector is an environmental state suitable for the operation of the predetermined function has been obtained.

Accordingly, when the condition that the detection result indicating that the environmental state detected by the detector is the environmental state suitable for the operation of the predetermined function has been obtained is satisfied, the operation mode for executing the predetermined function can be changed.

In addition, for example, in the changed operation mode, it may be displayed that the change in the operation mode is based on browsing.

Accordingly, since it is displayed in the changed operation mode that the change in the operation mode is based on browsing, the user can understand the reason for the change in the operation mode.

In addition, in the control method according to another specific example, a browsing relation degree indicating relationship between (i) a target device and a predetermined function of the target device and (ii) the browsing is determined based on browsing information on browsing using a browsing device; device information on a target control device that is the target device having the browsing relation degree of the browsing greater than or equal to a threshold is obtained; and an operation mode for executing the predetermined function of the target control device is changed when the device information obtained satisfies a specific condition.

With such a control method, the effects similar to the control system described above can be obtained.

In addition, the non-transitory computer-readable recording medium having recorded thereon a program according to another specific example is a non-transitory computer-readable recording medium having recorded thereon a program for causing a computer to execute the control method described above.

Non-transitory computer-readable recording medium having recorded thereon such a program can have the effects similar to the control method described above by using a computer.

(1-5) Summary

As described above, control system 10 includes determiner 132 and control unit 133. Determiner 132 determines, based on browsing information on browsing using browsing device 20, a browsing relation degree indicating relationship between a predetermined function of target device 30 and the browsing, and a browsing intensity indicating an intensity of the browsing. Control unit 133 reflects the browsing relation degree and the browsing intensity in the control of target device 30. According to this control system 10, the usability of target device 30 can be improved.

In other words, it can be said that control system 10 executes the method (control method) as shown in FIG. 2. The control method of the present embodiment includes determination step S12 and control step S13. Determination step S12 is a step of determining a browsing relation degree indicating the relationship between target device 30 and browsing, and a browsing intensity indicating an intensity of browsing, based on the browsing information browsed using browsing device 20. Control step S13 is a step of reflecting the browsing relation degree and the browsing intensity to in the control of target device 30. According to this control method, the usability of target device 30 can be improved as in control system 10.

Control system 10 is realized by using a computer system. That is, the method (control method) executed by control system 10 can be realized by the computer system executing the program. This program is a computer program for causing one or more processors to execute a control method. According to such a program, the usability of target device 30 can be improved as in control system 10.

(2) Variations

The embodiment of the present disclosure is not limited to the above embodiment. The above embodiment can be variously modified according to the design and the like as long as the subject of the present disclosure can be achieved. In the following, variations of the above embodiment are listed. The variations described below can be applied in combination as appropriate.

In one variation, control system 10 does not need to directly obtain browsing information from browsing device 20. For example, the browsing information of browsing device 20 may be collected by the information collecting server. In this case, control system 10 can obtain the browsing information of browsing device 20 from the information collection server.

In one variation, the browsing information may include information on the movement of the user's line of sight as a mode of browsing. The movement of the user's line of sight is considered to relate to the degree of interest of the user. Therefore, it is also possible to determine the browsing intensity based on the movement of the user's line of sight.

In one variation, control system 10 does not need to obtain usage information directly from target device 30. For example, the usage information of target device 30 may be collected by the information collection server. In this case, control system 10 can obtain the usage information of target device 30 from the information collection server.

In one variation, determiner 132 may use usage history 122, which is the history of the usage information of target device 30, for determining the browsing relation degree. In short, determiner 132 may use usage history 122, which is the history of the usage information of target device 30, for determining at least one of the browsing relation degree or the browsing intensity.

In one variation, determiner 132 does not need to individually determine the browsing relation degree and the browsing intensity. For example, determiner 132 may calculate a browsing score for comprehensively determining the browsing relation degree and the browsing intensity. In this case, control unit 133 can reflect the browsing score calculated by determiner 132 in the control of target device 30. As an example, control unit 133 may select a control to be executed from the first control, the second control, and the third control based on the browsing score.

In one variation, control unit 133 may reflect the browsing relation degree and the browsing intensity in the control of target device 30 by a method different from the above embodiment. The control of target device 30 includes a control for causing target device 30 to execute a function. Therefore, control unit 133 may determine the function to be executed by target device 30 based on the browsing relation degree and the browsing intensity, thereby reflecting the browsing relation degree and the browsing intensity in the control of target device 30.

In the above embodiment, operation history 123 is generated after the control (first control, second control, or third control) is executed by control unit 133, but the generation of operation history 123 may be executed regardless of the time of execution of the control by control unit 133. For example, the generation of operation history 123 may be executed after the obtaining of the browsing information (S11).

In one variation, control unit 133 may be able to execute only the first control and the second control, not all of the first control, the second control, and the third control. At this time, when the browsing intensity is lower than the second threshold, the first control may be executed or the second control may be executed instead of the third control.

In one variation, the linkage between browsing device 20 and target device 30 is not limited to the identification information unique to the user, and it can be done depending on whether browsing device 20 and target device 30 use the same IP address, whether they are on the same home network, or whether they are paired for the wireless communication.

In one variation, at least one of the browsing relation degree or the browsing intensity may be weighted according to the attribute information of the user. The attribute information may include, for example, the frequency of use of target device 30 by the user. In the case of the user with the high frequency of use, weighting may be performed so that at least one of the browsing relation degree or the browsing intensity is high. On the contrary, in the case of the user with the low frequency of use, weighting may be performed so that at least one of the browsing relation degree or the browsing intensity is low.

In one variation, target device 30 may also function as control system 10. As an example, the above control method may be implemented by one or more processors included in target device 30 executing a computer program. In addition, browsing device 20 may also function as control system 10. As an example, the above control method may be implemented by one or more processors included in browsing device 20 executing a computer program.

Control system 10 in the present disclosure includes, for example, a computer system. The computer system mainly includes a processor and a memory as hardware. The function as control system 10 in the present disclosure is realized by the processor executing the program recorded in the memory of the computer system. The program may be recorded in the memory of the computer system in advance, may be provided through a telecommunications line, and may be provided by being recorded on a non-temporary recording medium such as a memory card, optical disk, hard disk drive that can be read by the computer system. The processor of a computer system includes one or more electronic circuits including a semiconductor integrated circuit (IC) or a large scale integrated circuit (LSI). The integrated circuit such as IC or LSI referred to here has a different name depending on the degree of integration, and includes an integrated circuit called a system LSI, very large scale integration (VLSI), or ultra large scale integration (ULSI). Furthermore, a field-programmable gate array (FPGA) programmed after the LSI is manufactured, or a logical device capable of reconfiguring the junction relationships inside the LSI or reconfiguring the circuit partitions inside the LSI can also be adopted as a processor. A plurality of electronic circuits may be integrated on one chip, or may be provided to be distributed on a plurality of chips. The plurality of chips may be integrated in one device, or may be provided to be distributed in a plurality of devices. The computer system referred to here includes a microcontroller with one or more processors and one or more memories. Therefore, the microcontroller also includes one or more of electronic circuits including a semiconductor integrated circuit or a large-scale integrated circuit.

In addition, it is not an essential configuration for control system 10 that a plurality of functions in control system 10 are integrated in one housing, and the components of control system 10 may be provided to be distributed in the plurality of housings. Furthermore, at least a part of the functions of control system 10, for example, a part of the functions of processor 13 may be realized by a cloud (cloud computing) or the like.

(3) Aspects

As is clear from the above embodiment and variations, the present disclosure includes the following aspects. In the following, the reference numerals are given in parentheses only to clearly indicate the correspondence with the embodiment.

Aspect 1 is a control method, which includes a determination step (S12) and a control step (S13). The determination step (S12) is a step of determining a browsing relation degree indicating relationship between a target device (30) and browsing, and a browsing intensity indicating an intensity of browsing, based on the browsing information on browsing using a browsing device (20). The control step (S13) is a step of reflecting the browsing relation degree and the browsing intensity in the control of the target device (30). According to this aspect, the usability of the target device (30) can be improved.

Aspect 2 is a control method based on Aspect 1. In Aspect 2, the browsing relation degree indicates relationship between the function that can be executed by the target device (30) and the browsing. According to this aspect, the usability of the target device (30) can be improved with respect to the function of the target device (30).

Aspect 3 is a control method based on Aspect 1 or 2. In Aspect 3, the control of the target device (30) includes a control that presents a function that can be executed by the target device (30). According to this aspect, it is possible to change the content of the presentation of the function that can be executed by the target device (30) based on the browsing relation degree and the browsing intensity.

Aspect 4 is a control method based on any one of Aspects 1 to 3. In Aspect 4, the control of the target device (30) includes a control of causing the target device (30) to execute a function. According to this aspect, it is possible to change the content of the function executed by the target device (30) based on the browsing relation degree and the browsing intensity.

Aspect 5 is a control method based on any one of Aspects 1 to 4. In Aspect 5, the browsing intensity is determined based on a difference between a timing of use of the target device (30) and a timing of browsing. According to this aspect, it is possible to improve the reliability of browsing intensity.

Aspect 6 is a control method based on any one of Aspects 1 to 5. In Aspect 6, the browsing intensity is determined based on the aspect of browsing. According to this aspect, it is possible to improve the reliability of browsing intensity.

Aspect 7 is a control method based on any one of Aspects 1 to 6. In aspect 7, the determination step (S12) sets the browsing intensity to an initial value when a predetermined condition is satisfied. According to this aspect, it is possible to improve the reliability of browsing intensity.

Aspect 8 is a control method based on Aspect 7. In Aspect 8, the predetermined condition is that a predetermined time has elapsed since the browsing. According to this aspect, it is possible to improve the reliability of browsing intensity.

Aspect 9 is a control method based on any one of Aspects 1 to 8. In Aspect 9, the determination step (S12) uses the usage history (122), which is a history of the usage information of the target device (30), to determine at least one of the browsing relation degree or the browsing intensity. According to this aspect, the usability of the target device (30) can be improved.

Aspect 10 is a control method based on any one of Aspects 1 to 9. In Aspect 10, the control method further includes a generation step (S14) of generating an operation history (123), which is a history of the user's actions relating to the target device (30), based on the browsing history (121), which is a history of the browsing information, and the usage history (122), which is a history of the usage information of the target device (30). According to this aspect, it is possible to obtain the operation history (123) of the target device (30).

Aspect 11 is a program for causing one or more processors to execute the control method of any one of Aspects 1 to 10. According to this aspect, the usability of the target device (30) can be improved.

Aspect 12 is a control system (10), which includes a determiner (132) and a control unit (133). The determiner (132) determines, based on the browsing information on browsing using the browsing device (20), a browsing relation degree indicating relationship between the target device (30) and the browsing, and a browsing intensity indicating an intensity of the browsing. The control unit (133) reflects the browsing relation degree and the browsing intensity in the control of the target device (30). According to this aspect, the usability of the target device (30) can be improved.

The second to tenth aspects can be appropriately modified and applied to the eleventh and twelfth aspects.

The invention claimed is:

1. A control system comprising:
a processor; and
a memory storing a program, wherein:
the program, when executed by the processor causes the processor to function as:
a determiner that determines, based on browsing information on browsing a web page using a browsing device,
a browsing relation degree which is an index for determining an extent of a relationship between (i) a target device and a predetermined function of the target device and (ii) the web page browsed; and
a browsing intensity which is an index for determining an extent of interest in the web page browsed;
a device information obtainer that obtains device information on a target control device that is the target device determined based on the browsing relation degree of the browsing and the browsing intensity greater than or equal to a threshold; and
a control unit that changes an operation mode for executing the predetermined function of the target control device when the device information obtained satisfies a specific condition.

2. The control system according to claim 1,
wherein the target control device is the target device having the browsing relation degree of the browsing greater than or equal to a threshold.

3. The control system according to claim 1,
wherein the control unit reduces operation steps required to execute the predetermined function of the target control device.

4. The control system according to claim 3,
wherein on an operation screen on which execution buttons for executing the predetermined function and an other function of the target control device are displayed in a display order, the control unit changes the display order to place the execution button for executing the predetermined function higher than the execution button for executing the other function in the display order.

5. The control system according to claim 3,
wherein the control unit displays, as an interrupt, an operation screen including an execution button for executing the predetermined function of the target control device on a screen being operated.

6. The control system according to claim 1,
wherein the control unit increases operation steps required to execute the predetermined function of the target control device.

7. The control system according to claim 1,
wherein the predetermined function includes changing an operating parameter the used for operating the target control device.

8. The control system according to claim 1,
wherein the specific condition includes that execution of the predetermined function is set to off.

9. The control system according to claim 1,
wherein the specific condition includes that operation of the target control device is stopped.

10. The control system according to claim 1,
wherein the specific condition includes that the target control device is operated after a first period has elapsed from a timing when the predetermined function was executed.

11. The control system according to claim 1,
wherein the specific condition includes that a time elapsed from a timing of the browsing is within a second period.

12. The control system according to claim 1,
wherein the specific condition includes that an area where the target control device is installed corresponds to a predetermined area.

13. The control system according to claim 1,
wherein the specific condition includes that weather in an area where the target control device is installed is predetermined weather.

14. The control system according to claim 1,
wherein the specific condition includes that an accept signal, which indicates that a specific operation was received by a linked device with which the target control device links, has been obtained.

15. The control system according to claim 1,
wherein the specific condition includes that a detection result, which indicates that an environmental state detected by a detector is an environmental state suitable for an operation of the predetermined function, has been obtained.

16. The control system according to claim 1,
wherein in the operation mode changed, it is displayed that the change in the operation mode is based on the browsing.

17. A control method comprising:
determining, using a processor, based on browsing information on browsing a web page using a browsing device,
  a browsing relation degree which is an index for determining an extent of a relationship between (i) a target device and a predetermined function of the target device and (ii) the web page browsed; and
  a browsing intensity which is an index for determining an extent of interest in the web page browsed;
obtaining, using the processor, device information on a target control device that is the target device having the browsing relation degree of the browsing and the browsing intensity greater than or equal to a threshold; and
changing, using the processor, an operation mode for executing the predetermined function of the target control device when the device information obtained satisfies a specific condition.

18. A non-transitory computer-readable recording medium having recorded thereon a program for causing a computer to execute a control method comprising:
determining, based on browsing information on browsing a web page using a browsing device,
  a browsing relation degree which is an index for determining an extent of a relationship between (i) a target device and a predetermined function of the target device and (ii) the web page browsed; and
  a browsing intensity which is an index for determining an extent of interest in the web page browsed;
obtaining device information on a target control device that is the target device having the browsing relation degree of the browsing and the browsing intensity greater than or equal to a threshold; and
changing an operation mode for executing the predetermined function of the target control device when the device information obtained satisfies a specific condition.

* * * * *